US012726652B2

(12) United States Patent
Jung et al.

(10) Patent No.: US 12,726,652 B2
(45) Date of Patent: Sep. 1, 2026

(54) METHOD FOR DECODING, METHOD FOR ENCODING, AND METHOD FOR TRAINING MODEL

(71) Applicant: GUANGDONG OPPO MOBILE TELECOMMUNICATIONS CORP., LTD., Dongguan (CN)

(72) Inventors: Cheolkon Jung, Dongguan (CN); Hui Lan, Dongguan (CN); Zhe Ji, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 63 days.

(21) Appl. No.: 18/616,927

(22) Filed: Mar. 26, 2024

(65) Prior Publication Data

US 2024/0244256 A1 Jul. 18, 2024

Related U.S. Application Data

(63) Continuation of application No. PCT/CN2021/122366, filed on Sep. 30, 2021.

(51) Int. Cl.
*H04N 19/59* (2014.01)
*H04N 19/597* (2014.01)

(52) U.S. Cl.
CPC ........... *H04N 19/59* (2014.11); *H04N 19/597* (2014.11)

(58) Field of Classification Search
CPC ............................ H04N 19/59; H04N 19/597
See application file for complete search history.

(56) References Cited

U.S. PATENT DOCUMENTS

2010/0265315 A1* 10/2010 Okuda ................. H04N 13/161 348/43
2011/0069152 A1* 3/2011 Wang .................. H04N 13/261 348/43
2013/0194255 A1* 8/2013 Lee ...................... H04N 13/161 345/419
2015/0254811 A1* 9/2015 Sahu ......................... G06T 5/50 382/154
2016/0063715 A1* 3/2016 Wan .......................... G06T 3/40 382/195

(Continued)

FOREIGN PATENT DOCUMENTS

CN 112785635 * 5/2020
CN 112767294 5/2021

(Continued)

OTHER PUBLICATIONS

Jin, Zhi-hui CN 112785635 May 19, 2020 (Year: 2020).*

(Continued)

*Primary Examiner* — Zaihan Jiang
(74) *Attorney, Agent, or Firm* — Hodgson Russ LLP

(57) ABSTRACT

A method for decoding is disclosed. A first image and a second image of a scene are received by a processor. The first image is downsampled and is different from the second image. A residual map is obtained according to the second image and the downsampled first image by the processor. The downsampled first image is upsampled by the processor. The first image is reconstructed based on the upsampled first image and the residual map by the processor.

7 Claims, 13 Drawing Sheets

(56) References Cited

U.S. PATENT DOCUMENTS

| | | | | |
|---|---|---|---|---|
| 2020/0304773 | A1 * | 9/2020 | Tomkevicius | H04N 13/128 |
| 2021/0090274 | A1 * | 3/2021 | Fu | A01M 7/0089 |
| 2022/0100996 | A1 * | 3/2022 | Fu | A01M 21/046 |
| 2022/0101554 | A1 * | 3/2022 | Fu | G06V 10/82 |
| 2022/0166984 | A1 * | 5/2022 | Kang | H04N 19/597 |
| 2022/0180568 | A1 * | 6/2022 | Cho | G06N 3/09 |
| 2025/0286987 | A1 * | 9/2025 | Park | G06T 3/18 |

FOREIGN PATENT DOCUMENTS

| | | |
|---|---|---|
| CN | 112837219 | 5/2021 |
| CN | 113033645 | 6/2021 |
| WO | WO-2021123072 | * 12/2020 |
| WO | 2021096806 | 5/2021 |

OTHER PUBLICATIONS

Zuo et al., "MIG-Net: Multi-Scale Network Alternatively Guided by Intensity and Gradient Features for Depth Map Super-Resolution," IEEE Transactions on Multimedia, 2022, vol. 24.

EPO, Extended European Search Report for EP Application No. 21958952.0, Apr. 24, 2025.

WIPO, International Search Report and Written Opinion for International Application No. PCT/CN2021/122366, Jun. 24, 2022.

* cited by examiner

300

301

303

800

1300

METHOD FOR DECODING, METHOD FOR ENCODING, AND METHOD FOR TRAINING MODEL

CROSS REFERENCE TO RELATED APPLICATION(S)

This application is a continuation of International Application No. PCT/CN2021/122366, filed Sep. 30, 2021, the entire disclosure of which is incorporated herein by reference.

TECHNICAL FIELD

The present disclosure relates to the field of image and video coding, and more particular, to a method for decoding, a method for encoding, and a method for training a model.

BACKGROUND

In recent years, the storage and transmission of video data have become more and more common, and a huge amount of video data have been produced persistently. Thus, the effective compression of video data is increasingly important. Video coding technology has made meaningful contributions to the compression of video data. The earliest research on video compression can be traced back to 1929 when inter-frame compression was first proposed in that year. After years of research and development, mature video compression codec standards have gradually formed, such as audio video interleave (AVI), moving picture expert group (MPEG), advanced video coding (H.264/AVC), and high-efficiency video coding (H.265/HEVC). The latest versatile video coding (H.266/VVC) standard was officially published in 2020, representing the most advanced video coding technology at present. Although the structure of VVC is still based on the traditional hybrid video coding mode, its compression rate is about doubled.

SUMMARY

In a first aspect, a method for decoding is disclosed. A first image and a second image of a scene are received by a processor. The first image is downsampled and is different from the second image. A residual map is obtained according to the second image and the downsampled first image by the processor. The downsampled first image is upsampled by the processor. The first image is reconstructed based on the upsampled first image and the residual map by the processor.

In a second aspect, a method for encoding is disclosed. A first image of a scene is acquired by a first sensor. A second image of the scene is acquired by a second sensor. The first image is downsampled by a processor. The downsampled first image and the second image are compressed into a bitstream by the processor.

In a third aspect, a method for training a model is disclosed. A set of training samples is obtained by a processor. Each training sample in the set of training samples includes a color image of a scene, a downsampled depth image of the scene, and a ground truth (GT) residual map associated with edges of the scene and generated from a GT depth image. For each training sample, a residual map associated with the edges of the scene is estimated from the color image based on the downsampled depth image using a model by the processor. The model is trained based on a difference between each estimated residual map and the corresponding GT residual map using a loss function by the processor.

BRIEF DESCRIPTION OF THE DRAWINGS

The accompanying drawings, which are incorporated herein and form a part of the specification, illustrate embodiments of the present disclosure and, together with the description, further serve to explain the principles of the present disclosure and to enable a person skilled in the pertinent art to make and use the present disclosure.

Figure 1:
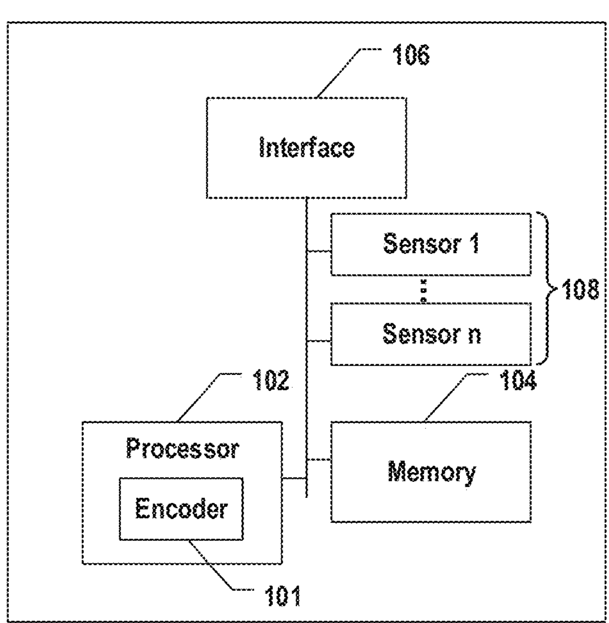
FIG. 1 illustrates a block diagram of an exemplary encoding system, according to some embodiments of the present disclosure.

Embodiments of the present disclosure will be described with reference to the accompanying drawings.

DETAILED DESCRIPTION

Although some configurations and arrangements are discussed, it should be understood that this is done for illustrative purposes only. A person skilled in the pertinent art will recognize that other configurations and arrangements can be used without departing from the spirit and scope of the present disclosure. It will be apparent to a person skilled in the pertinent art that the present disclosure can also be employed in a variety of other applications.

It is noted that references in the specification to "one embodiment," "an embodiment," "an example embodiment," "some embodiments," "certain embodiments," etc., indicate that the embodiment described may include a particular feature, structure, or characteristic, but every embodiment may not necessarily include the particular feature, structure, or characteristic. Moreover, such phrases do not necessarily refer to the same embodiment. Further, when a particular feature, structure, or characteristic is described in connection with an embodiment, it would be within the knowledge of a person skilled in the pertinent art to effect such feature, structure, or characteristic in connection with other embodiments whether or not explicitly described.

In general, terminology may be understood at least in part from usage in context. For example, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Various aspects of image and video coding systems will now be described with reference to various apparatus and methods. These apparatus and methods will be described in the following detailed description and illustrated in the accompanying drawings by various modules, components, circuits, steps, operations, processes, algorithms, etc. (collectively referred to as "elements"). These elements may be implemented using electronic hardware, firmware, computer software, or any combination thereof. Whether such elements are implemented as hardware, firmware, or software depends upon the particular application and design constraints imposed on the overall system.

The techniques described herein may be used for various image and video coding applications. As described herein, image and video coding includes both encoding and decoding a video, a frame of a video, or a still image (a.k.a., a map). For case of description, the present disclosure may refer to a video, a frame, or an image; unless otherwise stated, in either case, it encompasses a video, a frame of a video, and a still image.

The three-dimension (3D) extension of HEVC (3D-HEVC) is a 3D video coding standard investigated by Joint Collaborative Team on 3D Video Coding Extension Development (JCT-3V). The goal of 3D-HEVC is to improve the coding technology on the basis of HEVC to efficiently compress multi-viewpoints and their corresponding depth data. 3D-HEVC includes all the key technologies of HEVC and adds technologies that are conducive to multi-view video coding to improve the efficiency of 3D video coding and decoding. Compared with 2D video coding, 3D video coding transmits depth maps to facilitate the synthesis of virtual viewpoints at the decoding end, but there are certain differences between color and depth. Existing video encoding tools are not suitable for depth map encoding, and thus the study of 3D-HEVC is launched. Existing methods, however, are dedicated to modifying the internal modules of 3D-HEVC to improve performance but do not take the characteristics and correlation of the depth map and the color map into account.

On the other hand, with the recent advances in sensor technology, especially the popularization of multi-sensory data, there is a new opportunity to reform and elevate the compression efficiency using multi-sensor collaboration. Multi-sensor data have a significant advantage over single sensor data due to the unique property of each sensor. Multi-sensor collaboration, such as color and depth images, can remarkably increase the coding efficiency. Traditional video codecs, including 3D-HEVC, however, only save bits by removing redundancy and do not consider multi-sensor collaboration to save bits. Moreover, traditional 3D-HEVC has low compression efficiency for depth data, and when the quantization parameter (QP) is large, there will be obvious blocky artifacts. Although most existing methods based on deep learning may achieve speed-up of the prediction mode decision for coding unit/prediction unit (CU/PU), they cannot deal with blocky artifacts in a large QP caused by 3D-HEVC.

To save bits in the bitstream and achieve stable performance, the present disclosure provides various schemes of guided upsampling-based image and video coding using multi-sensor collaboration, such as color and depth images. As described below in detail, the present disclosure can be implemented for the compression of various multi-sensor data, such as color/depth and color/near-infrared, and can use various video compression standards (a.k.a. codec), such as HEVC, VVC, audio video standard (AVS), etc. In some embodiments, the color images acquired by a color sensor represent the color of the scene, while the depth images acquired by a depth sensor represent the 3D geometric shape of the scene. The two types of sensor data can be complementary, and the color images can help reconstruct their corresponding depth image.

According to some aspects of the present disclosure, to save bits in the bitstream in multi-sensor collaboration, an original depth image can be downsampled at the encoding side to become a low resolution (LR) depth image, and the downsampled LR image and the corresponding color image can be compressed, e.g., by 3D-HEVC, respectively, into the bitstream to be transmitted to the decoding side. On the decoding side, the color and depth information can be combined and used by guided upsampling to reconstruct and recover the high resolution (HR) depth image. In some embodiments, a machine learning model, such as a global residual estimation convolutional neural network (CNN) with downsampling-upsampling sub-models, is used to estimate a residual map from a number of HR intensity edges of a color image with the guidance of the downsampled LR depth image from another matching learning model (e.g., an LR depth upsampling CNN and the HR intensity edge map from another matching learning model (e.g., an intensity edge guidance CNN. In contrast, known approaches use depth upsampling CNN as the basis for estimating a residual map. That is, the HR color image is used to guide the residual estimation of the LR depth upsampling CNN with downsampling-upsampling sub-models, which has a limit of selecting effective depth edges from a number of HR intensity edges.

According to some aspects of the present disclosure, loss functions can be used to train the machine learning models used for guided sampling to generate clear and complete depth images. In some embodiments, the loss function between the estimated residual map and the ground truth (GT) residual map at the residual level, i.e., residual-level reconstruction, as opposed to between the reconstructed depth image and the GT depth image at the image level, i.e., image-level reconstruction, because the image level reconstruction in training the machine learning models tends to ignore residual reconstruction due to the relatively small value of the depth residual compared with the depth image.

Figure 2:
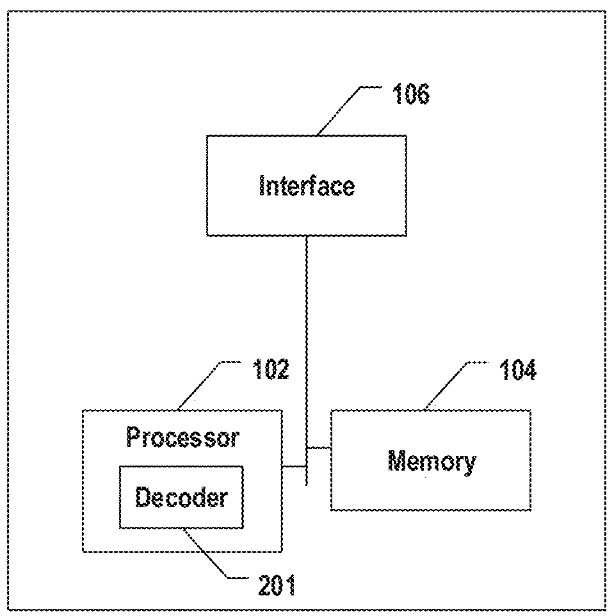
FIG. 2 illustrates a block diagram of an exemplary decoding system, according to some embodiments of the present disclosure.

FIG. 1 illustrates a block diagram of an exemplary encoding system 100, according to some embodiments of the present disclosure. FIG. 2 illustrates a block diagram of an exemplary decoding system 200, according to some embodiments of the present disclosure. Each system 100 or 200 may be applied or integrated into various systems and apparatus capable of data processing, such as computers and wireless communication devices. For example, system 100 or 200 may be the entirety or part of a mobile phone, a desktop computer, a laptop computer, a tablet, a vehicle computer, a gaming console, a printer, a positioning device, a wearable electronic device, a smart sensor, a virtual reality (VR) device, an argument reality (AR) device, or any other suitable electronic devices having data processing capability. As shown in FIGS. 1 and 2, system 100 or 200 may include a processor 102, a memory 104, and an interface 106. These components are shown as connected to one another by a bus, but other connection types are also permitted. It is understood that system 100 or 200 may include any other suitable components for performing functions described here.

Processor 102 may include microprocessors, such as graphic processing unit (GPU), image signal processor (ISP), central processing unit (CPU), digital signal processor (DSP), tensor processing unit (TPU), vision processing unit (VPU), neural processing unit (NPU), synergistic processing unit (SPU), or physics processing unit (PPU), microcontroller units (MCUs), application-specific integrated circuits (ASICs), field-programmable gate arrays (FPGAs), programmable logic devices (PLDs), state machines, gated logic, discrete hardware circuits, and other suitable hardware configured to perform the various functions described throughout the present disclosure. Although only one processor is shown in FIGS. 1 and 2, it is understood that multiple processors can be included. Processor 102 may be a hardware device having one or more processing cores. Processor 102 may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. Software can include computer instructions written in an interpreted language, a compiled language, or machine code. Other techniques for instructing hardware are also permitted under the broad category of software.

Memory 104 can broadly include both memory (a.k.a, primary/system memory) and storage (a.k.a., secondary memory). For example, memory 104 may include random-access memory (RAM), read-only memory (ROM), static RAM (SRAM), dynamic RAM (DRAM), ferro-electric RAM (FRAM), electrically erasable programmable ROM (EEPROM), compact disc read-only memory (CD-ROM) or other optical disk storage, hard disk drive (HDD), such as magnetic disk storage or other magnetic storage devices, Flash drive, solid-state drive (SSD), or any other medium that can be used to carry or store desired program code in the form of instructions that can be accessed and executed by processor 102. Broadly, memory 104 may be embodied by any computer-readable medium, such as a non-transitory computer-readable medium. Although only one memory is shown in FIGS. 1 and 2, it is understood that multiple memories can be included.

Interface 106 can broadly include a data interface and a communication interface that is configured to receive and transmit a signal in a process of receiving and transmitting information with other external network elements. For example, interface 106 may include input/output (I/O) devices and wired or wireless transceivers. Although only one memory is shown in FIGS. 1 and 2, it is understood that multiple interfaces can be included.

Processor 102, memory 104, and interface 106 may be implemented in various forms in system 100 or 200 for performing video coding functions. In some embodiments, processor 102, memory 104, and interface 106 of system 100 or 200 are implemented (e.g., integrated) on one or more system-on-chips (SoCs). In one example, processor 102, memory 104, and interface 106 may be integrated on an application processor (AP) SoC that handles application processing in an operating system (OS) environment, including running video encoding and decoding applications. In another example, processor 102, memory 104, and interface 106 may be integrated on a specialized processor chip for video coding, such as a GPU or ISP chip dedicated for image and video processing in a real-time operating system (RTOS).

As shown in FIG. 1, in encoding system 100, processor 102 may include one or more modules, such as an encoder 101. Although FIG. 1 shows that encoder 101 is within one processor 102, it is understood that encoder 101 may include one or more sub-modules that can be implemented on different processors located closely or remotely with each other. Encoder 101 (and any corresponding sub-modules or sub-units) can be hardware units (e.g., portions of an integrated circuit) of processor 102 designed for use with other components or software units implemented by processor 102 through executing at least part of a program, i.e., instructions. The instructions of the program may be stored on a computer-readable medium, such as memory 104, and when executed by processor 102, it may perform a process having one or more functions related to image and video encoding, such as downsampling, image partitioning, inter prediction, intra prediction, transformation, quantization, filtering, entropy encoding, etc., as described below in detail.

Similarly, as shown in FIG. 2, in decoding system 200, processor 102 may include one or more modules, such as a decoder 201. Although FIG. 2 shows that decoder 201 is within one processor 102, it is understood that decoder 201 may include one or more sub-modules that can be implemented on different processors located closely or remotely with each other. Decoder 201 (and any corresponding sub-modules or sub-units) can be hardware units (e.g., portions of an integrated circuit) of processor 102 designed for use with other components or software units implemented by processor 102 through executing at least part of a program, i.e., instructions. The instructions of the program may be stored on a computer-readable medium, such as memory 104, and when executed by processor 102, it may perform a process having one or more functions related to image and video decoding, such as entropy decoding, upsampling, inverse quantization, inverse transformation, inter prediction, intra prediction, filtering, as described below in detail.

Consistent with the scope of the present disclosure, for multi-sensor collaboration application, at least encoding system 100 further include a plurality of sensors 108 coupled to processor 102, memory 104, and interface 106 via the bus. Sensors 108 may include a first sensor 108 configured to acquire a first image of a scene (e.g., including one or more objects, a.k.a., scene object(s)), and a second sensor 108 configured to acquire a second image of the same scene. In some embodiments, the first and second images of the scene are different types of images but are complementary to one another with respect to the scene. In other words, first and second sensors 108 may obtain different types of image information of a scene that, when combined, provides a comprehensive visual representation of the scene. The first and second images may also have characteristics that are correlated, i.e., being correlated images of the same scene. In some embodiments, both first and second images may reflect the edges of the scene (including edges of the objects in the scene). For example, the first image acquired by first sensor 108 is a depth image, and the second image acquired by second sensor 108 is a color image. The depth image and color image may be correlated as both images can represent the edges of the same scene. The depth image and color image may also be complementary to one another with respect to the scene, e.g., a 3D scene, as the depth and color images, when combined, can provide a comprehensive visual representation of the scene.

In some embodiments, first sensor 108 is a depth sensor, and the depth image represents a 3D geometric shape of the scene. For example, the depth sensor may include any 3D range finder that acquires multi-point distance information across a wide field-of-view (FoV), such as light detection and ranging (LiDAR) distance sensors, time-of-flight (ToF) cameras, or light-field cameras. In some embodiments, second sensor 108 is a color sensor, and the color image represents the color of the scene. It is understood that the "color" referred to herein may encompass texture and grayscale as well. For example, the color sensor may include any sensor that detects the color of light reflected from an object in any suitable spectrum, such as visible (VIS) sensors, infrared sensors (IR), VIS-IR sensors, near-infrared (NIR) sensors, or red-green-blue/NIR (RGB-NIR) sensors. It is understood that various types of multi-sensor images (data) are not limited to color and depth and may be any other suitable types with respect to the same scene in other examples. It is also understood that the number of sensors 108 and the types of multi-sensor images are not limited to two and may be more than two in other examples. It is further understood that sensors 108 may be configured to acquire videos of different types, such as color video and depth video, each of which includes a plurality of frames, such as color frame and depth frames, respectively. It is still further understood that although not shown in FIG. 2, in some examples, decoding system 200 may include sensors 108 as well, like encoding system 100.

Figure 3A:
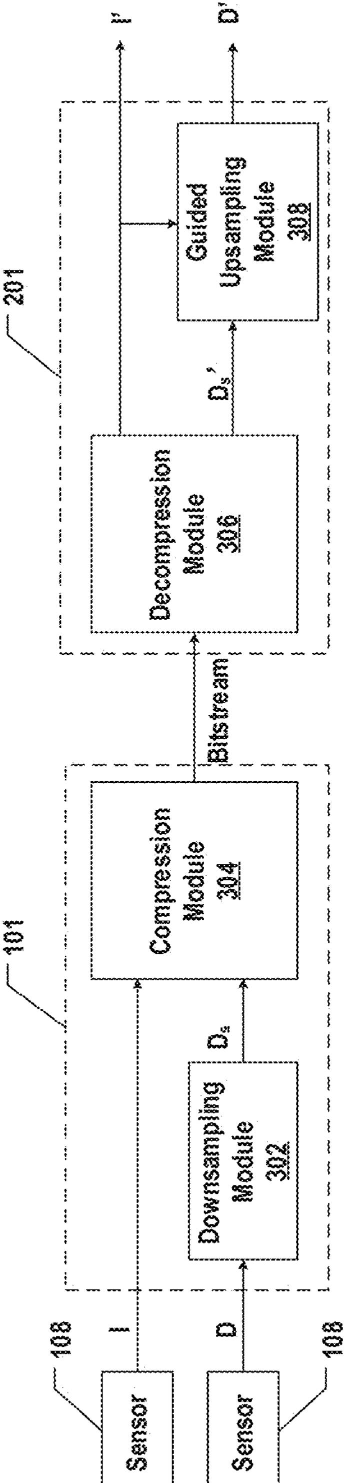
FIG. 3A illustrates a detailed block diagram of an exemplary encoding and decoding system, according to some embodiments of the present disclosure.

FIG. 3A illustrates a detailed block diagram of an exemplary encoding and decoding system 300, according to some embodiments of the present disclosure. System 300 may be a combination of encoding system 100 and decoding system 200 described above, or any portions of the combination. As shown in FIG. 3A, system 300 may include first and second sensors 108, encoder 101, and decoder 201. First sensor 108 may be configured to acquire a depth image D of a scene, and second sensor 108 may be configured to acquire a color image I of the same scene. As described above, a color image and a depth image are used as the example of two complementary images with respect to the same scene for case of description, and any other suitable types of complementary images with respect to the same scene may be used as well. As described above, the color image and depth of the image may be either still images (maps) or frames of videos captured by sensors 108. It is understood that in some examples, the depth image D and/or the color image I may not be acquired by first and/or second sensors 108 but obtained through any other suitable means. In one example, the depth image D and/or the color image I may be derived or otherwise obtained from other image(s) of the scene using any suitable image analysis or processing techniques. In another example, the depth image D and/or the color image I may be acquired by a third party and transmitted from the third party to encoder 101.

Figure 4:
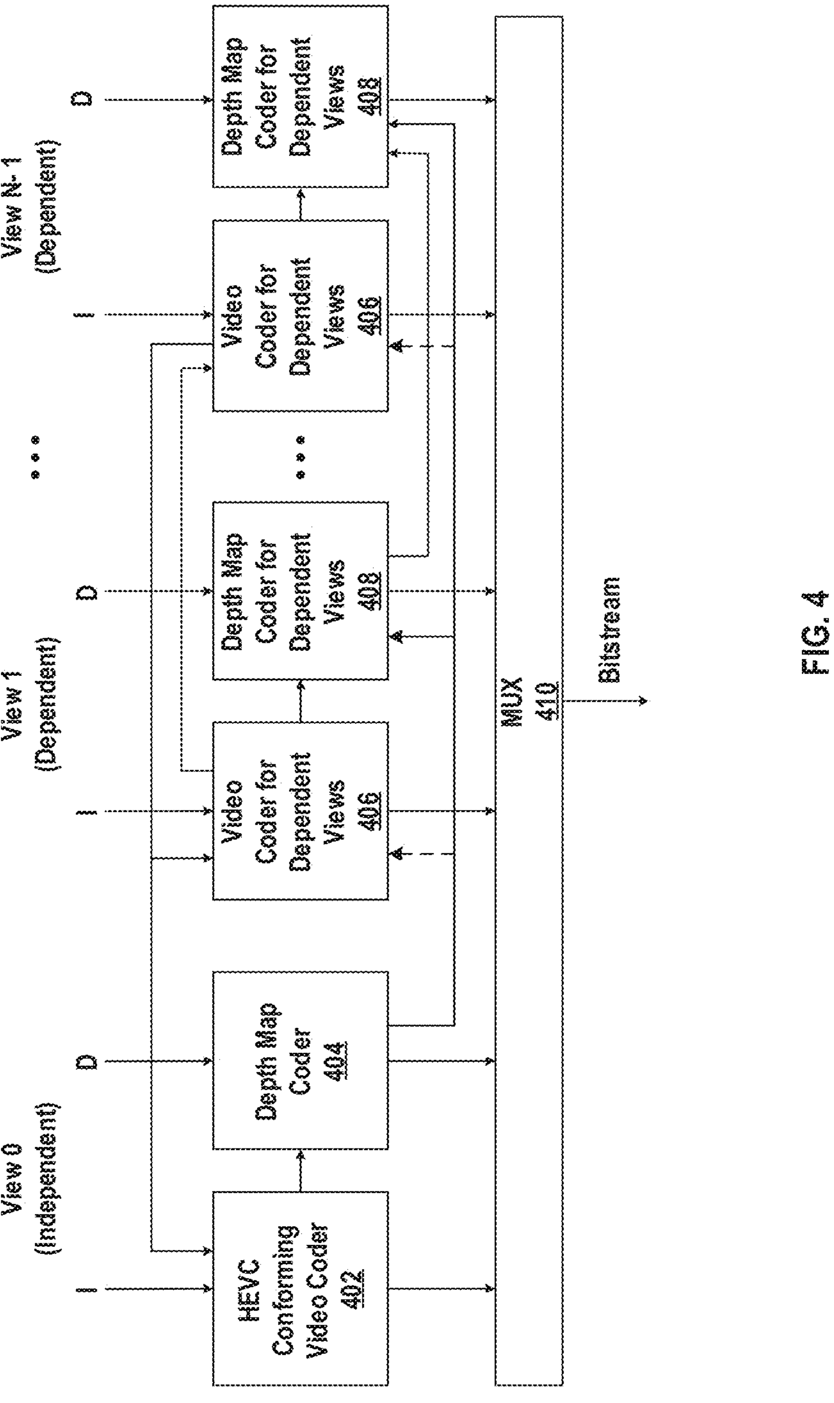
FIG. 4 illustrates a detailed block diagram of an exemplary compression module, according to some embodiments of the present disclosure.

As shown in FIG. 3A, encoder 101 (e.g., part of encoding system 100 or encoding and decoding system 300) may include a downsampling module 302 and a compression module 304. Downsampling module 302 is configured to downsample the original depth image D to generate a downsampled depth image $D_s$, according to some implementations. For example, the original depth image D may be an HR depth image, and the downsampled depth image $D_s$ may be an LR depth image after downsampling. It is understood that unless otherwise stated, an LR image and a downsampled image may be used interchangeably in the present disclosure. Downsampling module 302 may downsample the original depth image D to reduce its size (resolution) by any suitable downsampling techniques, including but not limited to interpolation, uniform sampling, a machine learning model, or any combination thereof. As a result, the amount of data (e.g., the number of bits) representing the downsampled depth image $D_s$ may become smaller than that of the original depth image D. In contrast, in some embodiments, the original color image I does not go through downsampling module 302 and thus, is not downsampled In some embodiments, compression module 304 is configured to compress (encode) the original color image I and the downsampled depth image $D_s$, respectively, into a bitstream. The compression may be performed independently for the original color image I and the downsampled depth image $D_s$. Compression module 304 may perform the compression using any suitable compression techniques (codecs), including but not limited to 3D-HEVC, VVC, AVS, etc. For example, FIG. 4 illustrates a detailed block diagram of exemplary compression module 304 implementing the 3D-HEVC codec, according to some embodiments of the present disclosure. As shown in FIG. 4, compression module 304 implementing 3D-HEVC codec may include an HEVC conforming video coder 402 and a depth map coder 404 configured to encode a color frame and a depth frame, respectively, in an independent view of a 3D video. Compression module 304 may also include multiple video coders 406 and depth map coders 408 each configured to encode a respective color frame and a respective depth frame in a respective one of N dependent views of the 3D video. Each depth frame may correspond to the downsampled depth image $D_s$ in FIG. 3A, and each color frame may correspond to the original color image I in FIG. 3A. Compression module 304 may further include a multiplexer 410 (MUX) to sequentially select the encoded data from each coder 402, 404, 406, or 406 to form a bitstream. That is, compression module 304 implementing 3D-HEVC codec can compress multi-viewpoints and their corresponding depth data into the bitstream by transmitting depth maps to facilitate the synthesis of virtual viewpoints at the decoding.

Referring back to FIG. 3A, decoder 201 (e.g., part of decoding system 200 or encoding and decoding system 300) may include a decompression module 306 and a guided upsampling module 308. In some embodiments, the bitstream including the compressed original color image I and downsampled depth image $D_s$ is transmitted from encoder 101 (e.g., by interface 106 of encoding system 100 in FIG. 1) to decoder 201. That is, decompression module 306 of decoder 201 may receive the bitstream having compressed original color image I and downsampled depth image $D_s$ (e.g., by interface 106 of decoding system 200 in FIG. 2). By reducing the size (resolution) of the depth image from the original depth image to D to downsampled depth image $D_s$, the number of bits transmitted in the bitstream can be reduced to improve the throughput of system 300. Decompression module 306 may be configured to decompress the compressed original color image I and downsampled depth image $D_s$ from the bitstream to reconstruct color image I' and downsampled depth image $D_s$', respectively, using the same compression techniques (codec) implemented by compression module 304, including but not limited to, 3D-HEVC, VVC, AVS, etc. The decompression may be performed independently for the compressed color image I and downsampled depth image $D_s$. In some embodiments, the 3D-HEVC codec is implemented by decompression module 306 to obtain color image I' and downsampled depth image $D_s$', respectively. It is understood that in some examples, the downsampled depth image $D_s$' and/or the color image I' may not be obtained by decoder 201 from the decompressed bitstream but obtained through any other suitable means. In one example, the downsampled depth image $D_s$' and/or the color image I' may be derived or otherwise obtained from other image(s) of the scene using any suitable image analysis or processing techniques. In another example, the downsampled depth image $D_s$' and/or the color image I' may be acquired by sensors coupled directly to decoder 201 (on the decoder side, not shown).

It is understood that decompression module 306 may not perfectly restore the original color image I and downsampled depth image $D_s$ from the bitstream, for example, due to information loss, depending on the codec used by compression module 304 and decompression module 306. In other words, color image I' may not be identical to original color image I, and downsampled depth image $D_s$' may not be identical to downsampled depth image $D_s$. It is understood that in the present disclosure, the compression and decompression processes performed by compression module 304 and decompression module 306, respectively, may be sometimes referred to together as a compression process as well. Accordingly, color image I' and downsampled depth image $D_s$' outputted from decompression module 306 may be sometimes referred to as a compressed color image I' and a compressed downsampled depth image $D_s$', respectively, as well. Depending on the compression efficiency for depth data and/or the QP used by compression module 304 and decompression module 306 during the compression/decompression process, blocky artifacts may appear at the edges of the scene on downsampled depth image $D_s$' and color image I' with information loss, thereby causing blurry or other distortions. For example, when using the 3D-HEVC codec with a relatively low compression efficiency for depth data, the larger the QP is, the blurrier the edges of the scene may be on downsampled depth image $D_s$'.

Guided upsampling module 308 may be configured to reconstruct a depth image D' from LR downsampled depth image $D_s$'. The conventional LR depth upsampling process, however, may cause blurry, in particular, at the edges of the scene, due to the lack of high-frequency components. On the other hand, HR color image I' has a number of clear and complete edges for reconstructing HR depth image D. Moreover, HR color image I' may also contain unnecessary edges for reconstructing HR depth image D, thereby causing texture copying artifacts after reconstructing HR depth image D. Even though the edges in HR color image I' can provide important clues for reconstructing HR depth image D, they cannot be directly used in upsampling.

Figure 3B:
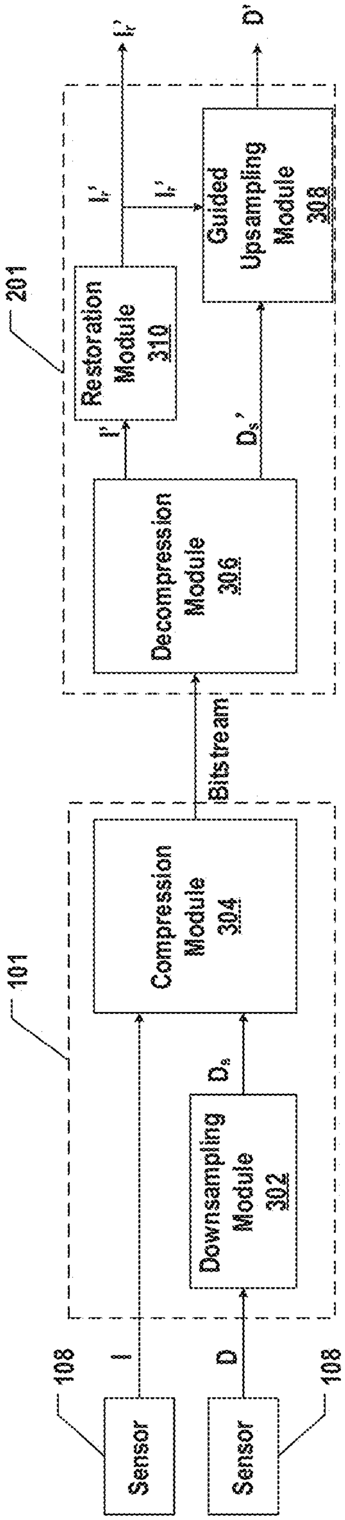
FIG. 3B illustrates a detailed block diagram of another exemplary encoding and decoding system, according to some embodiments of the present disclosure.

Consistent with the scope of the present disclosure, guided upsampling module 308 may be configured to reconstruct depth image D' from downsampled depth image $D_s$' with the guidance of a residual map obtained from color image I'. As original HR color image I and original HR depth image D are correlated, compressed HR color image I' and LR downsampled depth image $D_s$' are also correlated, according to some embodiments. Thus, the correlated characteristics and information thereof (e.g., at the edges of the scene) in HR color image I' and LR downsampled depth image $D_s$' can be combined in guided upsampling module 308 to recover the HR depth image D' after upsampling. In some embodiments, guided upsampling module 308 performs depth upsampling using a machine learning model, such as a CNN, configured to estimate a residual map from HR color image I' guided by LR depth image $D_s$' (and HR intensity edges as well in some examples) and fuse it with an upsampled version of LR depth image $D_s$' (e.g., using LR depth upsampling, e.g., interpolation) to reconstruct HR depth image D'. For example, as described below in detail, the machine learning model may include a global residual estimation model (e.g., a CNN) with downsampling-upsampling sub-models to estimate a residual map from a number of HR intensity edges in HR color image I' with the guidance of LR depth image $D_s$' from another depth upsampling model (e.g., a CNN) and the HR intensity edge map from another intensity edge guidance model (e.g., a CNN). The residual map may be associated with edges of the scene (e.g., with clear and complete edges) and thus, may be used to enhance the edges when reconstructing HR depth image D FIG. 3B illustrates a detailed block diagram of another exemplary encoding and decoding system 301, according to some embodiments of the present disclosure. System 301 is similar to system 300 except that system 301 additionally includes a restoration module 310 in decoder 201, according to some embodiments. As described above, since color image I' is compressed and decompressed, it may contain blocky artifacts with information loss, which may affect the performance of guided upsampling module 308. Restoration module 310 thus may be configured to enhance the visual quality of compressed color image I' to generate a restored color image $I_r$' and provide restored color image $I_r$' to guided upsampling module 308 to replace compressed color image I' in estimating the residual map as described herein with respect to guided upsampling module 308. In some implementations, restoration module 310 implements a machine learning model (e.g., a CNN) to reduce the blocky artifacts in restored color image $I_r$' and further improve the quality of reconstructed depth image D'. The details of the same elements in systems 300 and 301 are not repeated for case of description.

Figure 3C:
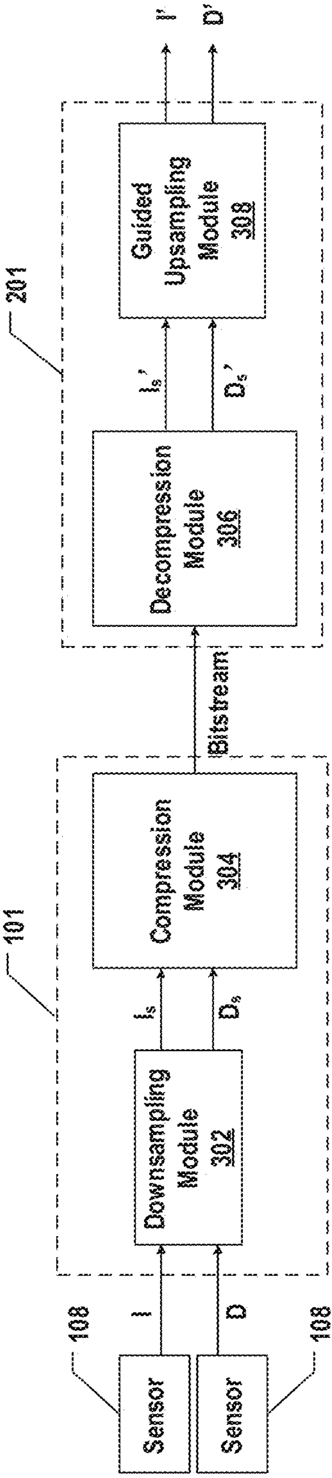
FIG. 3C illustrates a detailed block diagram of still another exemplary encoding and decoding system, according to some embodiments of the present disclosure.

FIG. 3C illustrates a detailed block diagram of still another exemplary encoding and decoding system 303, according to some embodiments of the present disclosure. System 303 is similar to system 300 except that original color image I is downsampled by downsampling module 302 in encoder 101 as well to generate downsampled color image Is, according to some embodiments. Accordingly, compression module 304 may compress downsampled color image $I_s$, as opposed to original color image I, into the bitstream. In decoder 201, guided upsampling module 308 may perform both depth upsampling and color upsampling using a machine learning model to reconstruct depth image D' and color image I' from downsampled depth image $D_s$' and downsampled color image $I_s$', respectively. For example, the estimated residual map associated with the edges of the scene may be used to reconstruct both depth image D' and color image I' from downsampled depth image $D_s$' and downsampled color image $I_s$', respectively. Compared with system 300, by downsampling original color image I in encoder 101, the number of bits in the bitstream can be further reduced in system 303. The details of the same elements in systems 300 and 303 are not repeated for ease of description. As described above, it is understood that the number and/or types of images that can be applied in the image and video coding using multi-sensor collaboration by systems 300, 301, and 301 are not limited by the examples described above with respect to FIGS. 3A-3C and may vary in other examples.

It is understood that each of the elements shown in FIGS. 3A-3C is independently shown to represent characteristic functions different from each other in systems 300, 301, and 303, and it does not mean that each component is formed by the configuration unit of separate hardware or single software. That is, each element is included to be listed as an element for convenience of explanation, and at least two of the elements may be combined to form a single element, or one element may be divided into a plurality of elements to perform a function. It is also understood that some of the elements are not necessary elements that perform functions described in the present disclosure but instead may be optional elements for improving performance. It is further understood that these elements may be implemented using electronic hardware, firmware, computer software, or any combination thereof. Whether such elements are implemented as hardware, firmware, or software depends upon the particular application and design constraints imposed on systems 300, 301, and 303.

Figure 5:
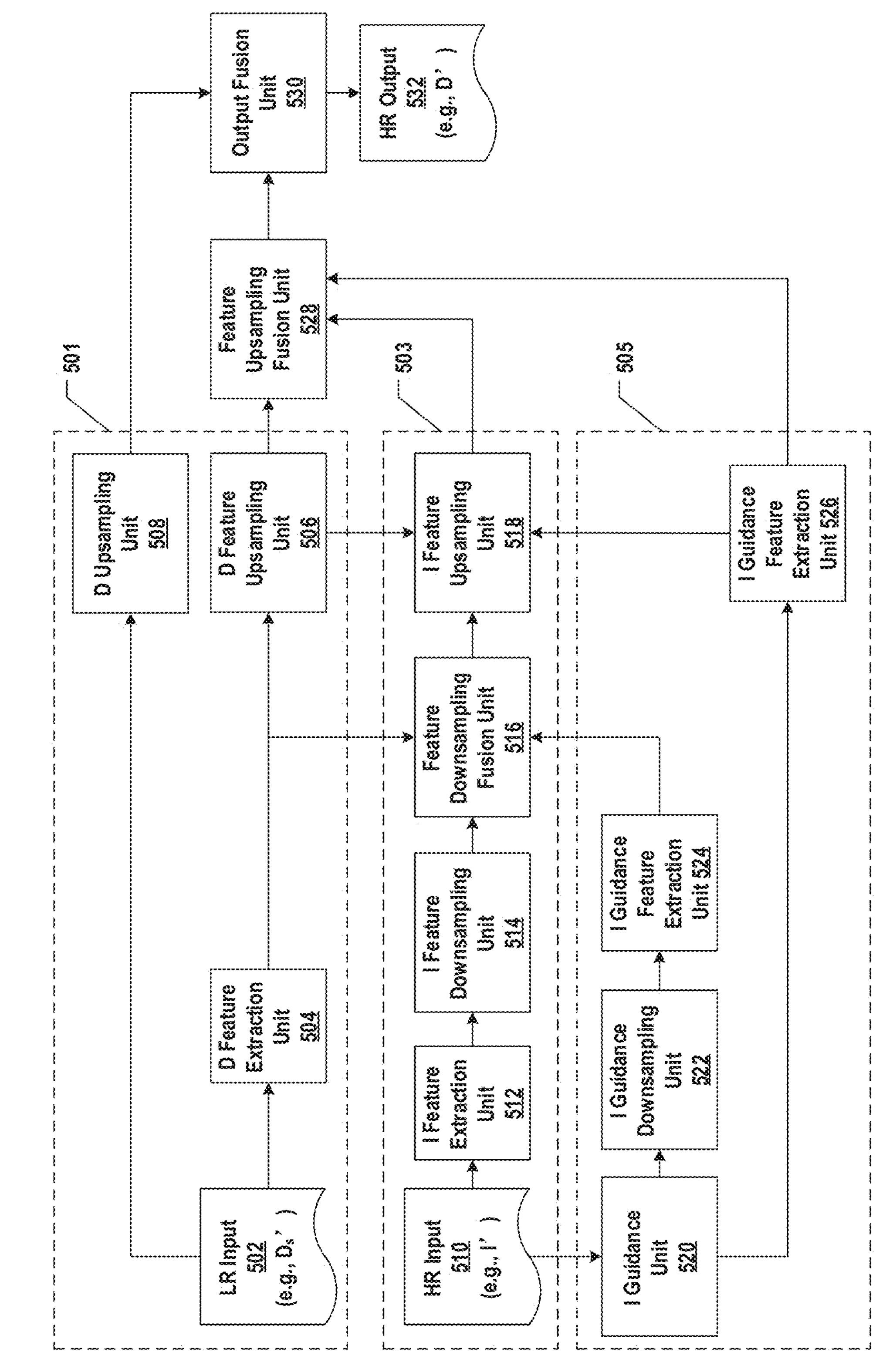
FIG. 5 illustrates a detailed block diagram of an exemplary guided upsampling module, according to some embodiments of the present disclosure.

FIG. 5 illustrates a detailed block diagram of exemplary guided upsampling module 308, according to some embodiments of the present disclosure. As shown in FIG. 5, guided upsampling module 308 may include a depth path 501, a color path 503, and a guidance path 505. Depth path 501 may be configured to receive an LR input 502 (e.g., compressed downsampled depth image $D_s$') and estimate a depth edge feature map based on the LR input 502. Depth path 501 may include a depth (D) feature extraction unit 504, a depth feature upsampling unit 506, and a depth upsampling unit 508. Guidance path 505 may be configured to derive an intensity edge map from an HR input 510 (e.g., compressed color image I') and estimate an intensity edge feature map based on the intensity edge map. Guidance path 505 may include a color (I) guidance unit 520, a color guidance downsampling unit 522, a color guidance feature extraction unit 524, and a color guidance feature extraction unit 526. Color path 503 may be configured to receive HR input 510 (e.g., compressed color image I') and estimate a color edge feature map based on the color image, the depth image, and the intensity edge map. Color path 503 may include a color feature extraction unit 512, a color feature downsampling unit 514, a feature downsampling fusion unit 516, and a color feature upsampling unit 518. That is, correlated edge features may be estimated from each of depth path 501, color path 503, and guidance path 505 in the forms of a depth edge feature map, a color edge feature map, and an intensity edge feature map, respectively, each of which may be associated with the edges of the scene.

In some embodiments, since color path 503 deals with HR input 510 (e.g., without downsampling), color path 503 is the main path for estimating the residual map associated with the edges, and information extracted from other paths, e.g., depth path 501 and guidance path 505 may be fused to color path 503 to help the estimation of the color edge feature map. As shown in FIG. 5, guided upsampling module 308 may further include a feature upsampling fusion unit 528 configured to receive the depth edge feature map from depth path 501, the color edge feature map from color path 503, and the intensity edge feature map from guidance path 505, and fuse the depth edge feature map and the intensity edge feature map to the color edge feature map. Feature upsampling fusion unit 528 may also be configured to estimate the residual map associated with the edges based on the fused color edge feature map. In other words, guided upsampling module 308 obtains the residual map associated with the edges of the scene from the color image based on the downsampled depth image and the intensity edge map, according to some embodiments. For example, a residual map may be obtained from a number of HR intensity edges with the guidance of the LR depth image and the HR intensity edge map.

As shown in FIG. 5, guided upsampling module 308 may further include an output fusion unit 530 configured to receive the residual map from feature upsampling fusion unit 528 and upsampled LR input 502 (e.g., an upsampled version of downsampled depth image $D_s$'), and reconstruct an HR output 532 (e.g., depth image D') by fusing the residual map to upsampled LR input 502. That is, guided upsampling module 308 may perform residual level reconstruction of depth image D', as opposed to image level reconstruction, which tends to ignore residual reconstruction because the depth residual has a relatively small value compared with the depth image. By fusing the residual map associated with the edges to the depth image, the blurry and other distortions at the edges due to the information loss from downsampling and compression can be compensated to enhance the image quality.

Figure 6:
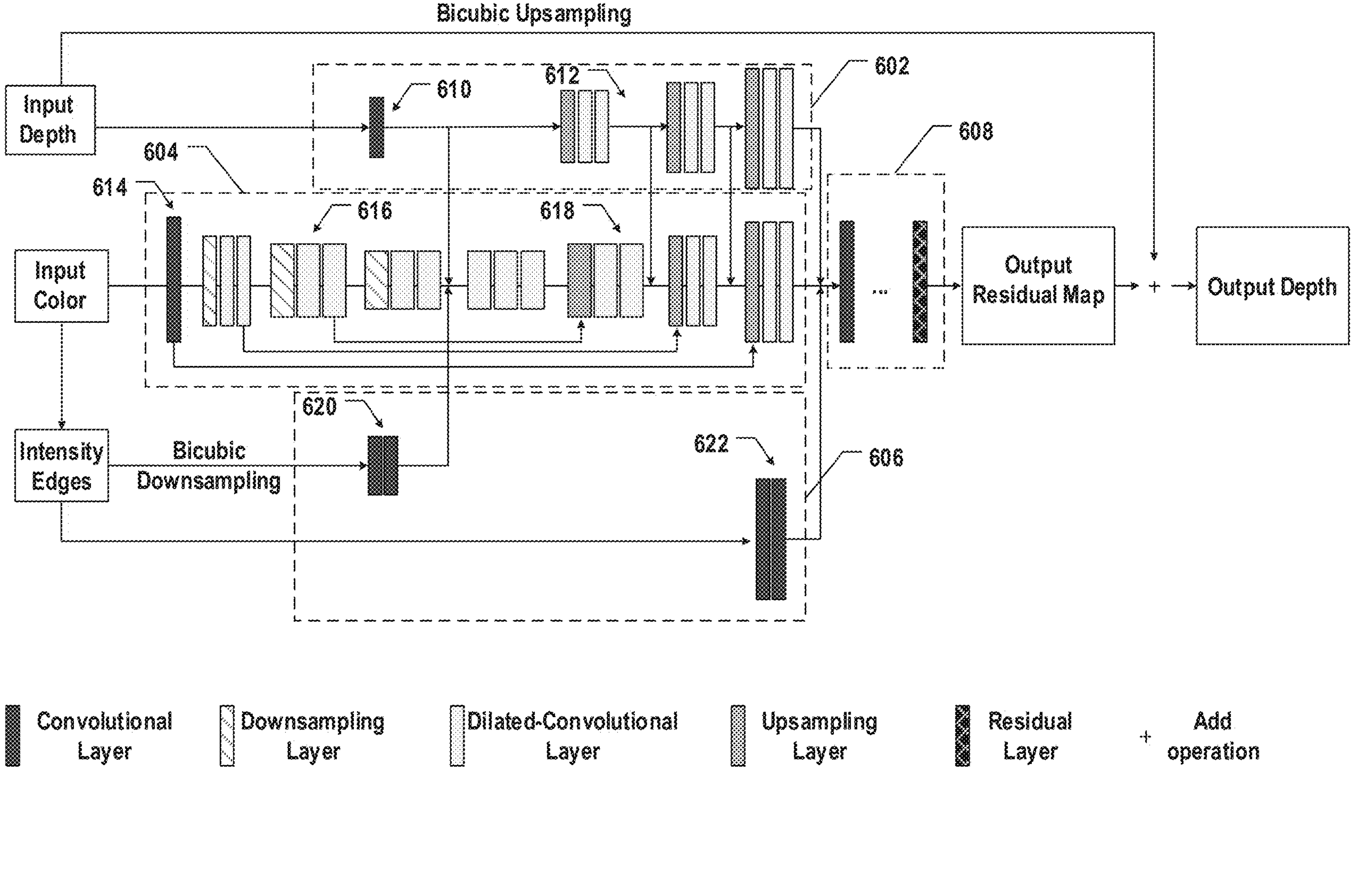
FIG. 6 illustrates a detailed block diagram of an exemplary guided upsampling module using machine learning models, according to some embodiments of the present disclosure.

Consistent with the scope of the present disclosure, in some implementations, machine learning models, such as CNNs, are used by each of depth path 501, color path 503, guidance path 505, and feature upsampling fusion unit 528 to improve the efficiency and effectiveness of guided upsampling module 308, for example, as shown in FIG. 6. FIG. 6 will be described together with FIG. 5 in describing guided upsampling module 308 implementing machine learning models. It is understood that in some examples, any other suitable machine learning models, such as regression, support vector machine (SVM), decision tree, Bayesian network, etc., may be implemented by guided upsampling module 308.

Figure 7C:
FIGS. 7A-7F illustrate various exemplary types of feature maps generated by the guided upsampling module in FIG. 6, according to some embodiments of the present disclosure.
Figure 7F:
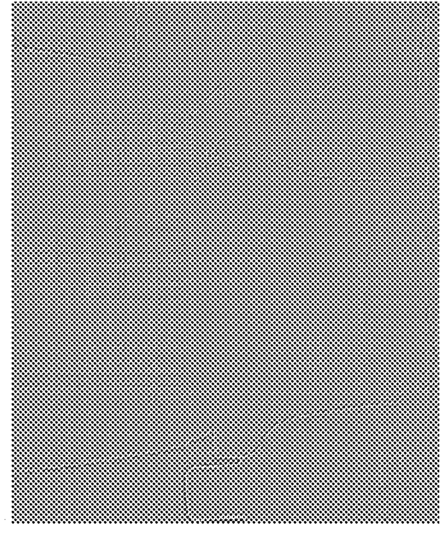
Figure 7B:
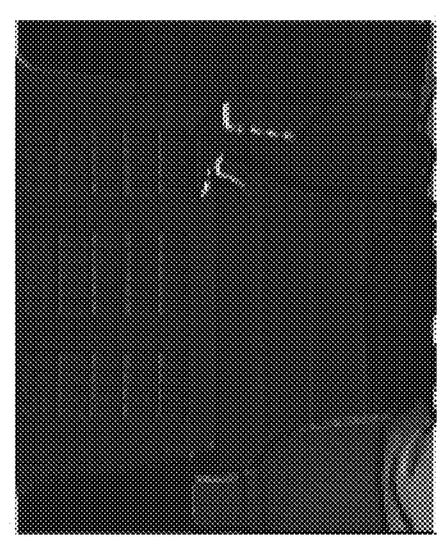

As shown in FIGS. 5 and 6, depth path 501 may include a machine learning model 602 and estimate the depth edge feature map based on LR input 502 using machine learning model 602. Depth feature extraction unit 504 may be configured to extract a depth edge feature from LR input 502, for example, using a sub-model 610 of machine learning model 602. Although LR input 502 (e.g., downsampled depth image $D_s$') is of low resolution, but it can provide approximate locations of edges that can facilitate the estimation of the residual map from HR input 510. In some embodiments, sub-model 610 includes a convolutional layer configured to extract initial features (e.g., depth edge feature) from downsampled depth image $D_s$'. Depth feature upsampling unit 506 may be configured to upsample the extracted depth edge feature, for example, using a sub-model 612 of machine learning model 602. In some embodiments, sub-model 612 includes a number of levels each including an upsampling layer and a number of dilated convolutional layers to upsample the initial features step-by-step and get deep semantic information with multiscale features. The dilated convolutional layer may be similar to convolutional layer. Both dilated convolutional layer and convolution layers can be used to extract the features from images of features, but the parameter (e.g., dilation factor) of a dilated convolutional layer may be 2, which has a larger receptive field. As described below, the semantic information with multiscale features from each step of sub-model 612 may be used by color path 503 to distinguish between valid and invalid edges. The depth edge feature map may be outputted from depth feature upsampling unit 506. For example, FIG. 7B shows one example of a depth edge feature map outputted from depth path 501 that contains object boundaries, compared with the GT depth image in FIG. 7A As shown in FIGS. 5 and 6, color path 503 may include a machine learning model 604 and estimate the color edge feature map based, at least in part, on HR input 510 and LR input 502 (e.g., information obtained from depth path 501) using machine learning model 604. For example, color path 503 may output a clear edge feature that is guided by downsampled depth image $D_s'$ (and HR intensity edges E in some examples). In some embodiments, color image I' is first converted to grayscales $G^H$ to remove some useless color information. Color feature extraction unit 512 may be configured to extract a color edge feature from HR input 510 (e.g., color image I'), for example, using a sub-model 614 of machine learning model 604. In some embodiments, sub-model 614 includes a convolutional layer configured to extract initial features (e.g., color edge feature) from color image I' or grayscales $G^H$. Color feature downsampling unit 514 may be configured to downsample the extracted color edge feature, for example, using a sub-model 616 of machine learning model 604. In some embodiments, sub-model 616 includes a number of levels each including a downsampling layer and a number of dilated convolutional layers to downsample the initial features step-by-step. For example, sub-model 616 may use a convolutional layer with stride 2, instead of a pooling layer, because the pooling layer may cause spatial information loss and have a limit of reconstructing small object information.

Feature downsampling fusion unit 516 may be configured to fuse the extracted depth edge feature from depth feature extraction unit 504 in depth path 501 to the downsampled color edge feature. In some embodiments, feature downsampling fusion unit 516 performs a concatenation operation to fuse the depth edge feature to the downsampled color edge feature. In order to perform the concatenation operation, the size (resolution) of the two feature maps need to be the same. Thus, the size of the extracted depth edge feature from depth path 501 may be the same as the size of the downsampled color edge feature from color path 503. That is, the number levels of downsampling in sub-model 616 may be set in a way that the size of downsampled color edge feature can match the size of the extracted depth edge feature.

Color feature upsampling unit 518 may be configured to upsample the fused color edge feature based on the upsampled depth edge feature, for example, using a sub-model 618 of machine learning model 604. In some embodiments, sub-model 618 includes a number of levels each including an upsampling layer and a number of dilated convolutional layers to upsample the fused color edge feature step-by-step. As shown in FIG. 6, at each level of sub-model 618, information of the upsampled depth edge feature in a corresponding level of sub-model 612 may be integrated to guide sub-model 618 for upsampling. As described above, it may be difficult to accurately estimate the residual map only from color image I' for reconstructing depth image D'. Thus, the approximate locations of edges from depth image $D_s'$ may be used to guide the color feature upsampling. For example, the information of the upsampled depth edge feature may be used to distinguish between valid and invalid edges in the fused color edge feature. Although not shown, it is understood that in some examples, at one or more levels of sub-model 612, a batch normalization (BN) layer and a rectified linear unit (ReLU) may be added as well. The color edge feature map may be outputted from color feature upsampling unit 518. For example, FIG. 7C shows one example of a color edge feature map outputted from color path 503 that contains partial contours and internal textures, compared with the GT depth image in FIG. 7A.

Figure 7E:
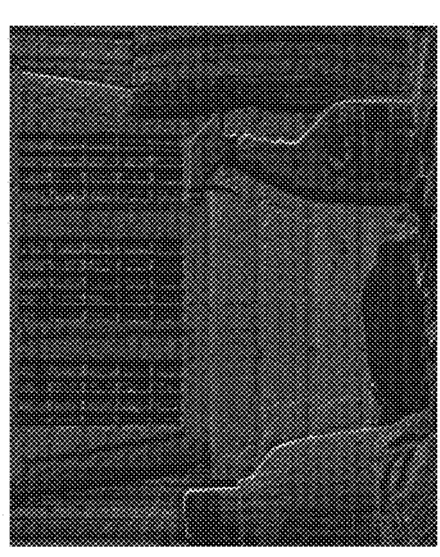
Figure 7A:
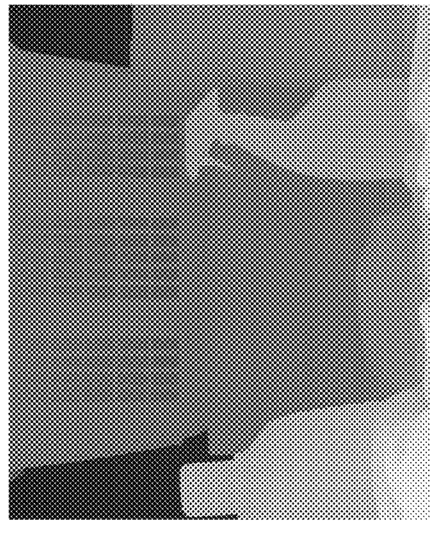
Figure 7D:

The edge information may be inevitably lost due to multiple down-sampling and up-sampling operations through color path 503. Thus, additionally or optionally, guidance path 505 may provide HR intensity edges to color path 503 to further guide the color feature upsampling. Color guidance unit 520 may be configured to derive an intensity edge map from HR input 510 (e.g., a color image I'). For example, the intensity edge map E of grayscale $G^H$ converted from color image I' may be calculated as:

$$E = G^H - \mathrm{Up}(\mathrm{Down}(G^H)), \tag{1}$$

where Up(•) and Down(•) represent the upsampling and downsampling operations, respectively. The HR intensity edge map E may be the high-frequency component of $G^H$. It is understood that in some examples, color guidance information other than intensity may be derived from color image I' to guide the color feature upsampling. In order to match with the LR downsampled color edge feature and depth edge feature fused at feature downsampling fusion unit 516, color guidance downsampling unit 522 may be configured to downsample the intensity edge map using any suitable downsampling techniques, such as bicubic downsampling, to reduce the size (resolution) of the intensity edge map, i.e., becoming an LR intensity edge map. Color guidance feature extraction unit 524 may be configured to extract a downsampled intensity edge feature from the downsampled intensity edge map, for example, using a sub-model 620 of machine learning model 606. In some embodiments, sub-model 620 includes a convolutional layer configured to extract initial features (e.g., LR intensity edge feature) from the LR intensity edge map. On the other hand, in order to match with the HR upsampled color edge feature and depth edge figure, i.e., the color edge feature map and depth feature map, color guidance feature extraction unit 526 may be configured to extract an intensity edge feature from the intensity edge map, for example, using a sub-model 622 of machine learning model 606. In some embodiments, sub-model 622 includes a convolutional layer configured to extract initial features (e.g., HR intensity edge feature) from the HR intensity edge map. The intensity edge feature map may be outputted from color guidance feature extraction unit 526. For example, FIG. 7D shows one example of an intensity edge feature map outputted from guidance path 505 that contains most textures, compared with the GT depth image in FIG. 7A.

As shown in FIGS. 5 and 6, in some embodiments, the downsampled intensity edge feature is provided by color guidance feature extraction unit 524 to feature downsampling fusion unit 516, such that the downsampled intensity edge feature is fused to the downsampled color edge feature in addition to the depth edge feature to further guide the color edge feature upsampling. Accordingly, the sizes (resolution) of the downsampled color edge feature, the downsampled intensity edge feature, and the depth edge feature at feature downsampling fusion unit 516 may be the same. In some embodiments, the intensity edge feature is provided by color guidance feature extraction unit 526 to color feature upsampling unit 518 as well to further guide the color edge feature upsampling. That is, color guidance feature extraction units 524 and 526 may extract intensity edge features from LR and HR intensity edge maps, each of which may be fused into a corresponding unit (and corresponding level in a sub-model) in color path 503.

The outputs of depth path 501, color path 503, and guidance path 505 may include the depth edge feature map (e.g., HR depth edge features $$f_D^H),$$

the color edge feature map (e.g., HR color edge features $$f_I^H),$$

and the intensity edge feature map (e.g., HR intensity edge features $$f_E^H).$$

The three types of edge feature maps may be fused by feature upsampling fusion unit 528 to estimate the residual map associated with the edges. In some embodiments, feature upsampling fusion unit 528 is configured to fuse the estimated depth edge feature map and the estimated intensity edge feature map to the estimated color edge feature map. In some embodiments, feature upsampling fusion unit 528 performs a concatenation operation to fuse the depth edge feature map and the intensity edge feature map to the color edge feature map. In order to perform the concatenation operation, the size (resolution) of the three feature maps need to be the same. Thus, the sizes of the estimated depth edge feature map from depth path 501, the estimated color edge feature map from color path 503, and the estimated intensity edge feature map from guidance path 505 may be the same. That is, the number levels of upsampling in sub-models 612 and 618 may be set in a way that the size of the color edge feature map can match the size of the depth edge feature map, which in turn match the size of the intensity edge feature map.

Feature upsampling fusion unit 528 may include a machine learning model 608 configured to estimate the residual map based on the three types of edge feature maps. In some embodiments, machine learning model 608 includes a number of dilated convolutional layers and a residual layer to estimate the residual map. Although not shown, it is understood that in some examples, at one or more levels of machine learning model 608, a BN layer and a ReLU may be added as well. For example, FIG. 7E shows one example of an interim residual map after the first layer in machine learning model 608 that roughly fuses different types of features such as depth, color, and intensity edges, while FIG. 7F shows one example of the final residual map estimated using machine learning model 608 that contains clear depth edges.

The estimated residual map may be fused to an upsampled version of downsampled depth image $D_s'$ (an example of HR output 532) to reconstruct depth image D' at output fusion unit 530. In some embodiments, depth upsampling unit 508 of depth path 501 is configured to upsample downsampled depth image $D_s'$ using any suitable upsampling techniques, such as bicubic upsampling, to increase the size (resolution) of downsampled depth image $D_s'$. As described above, due to the edge information loss from compression/decompression and downsampling/upsampling, the edges of the scene in the upsampled version of downsampled depth image $D_s'$ after depth upsampling unit 508 may be blurry or otherwise distorted, which can be compensated by the estimated residual map by output fusion unit 530. In some embodiments, output fusion unit 530 performs an add operation to add the estimated residual map to the upsampled version of downsampled depth image $D_s'$. For example, an element-wise addition at the pixel level may be performed.

Figure 8:
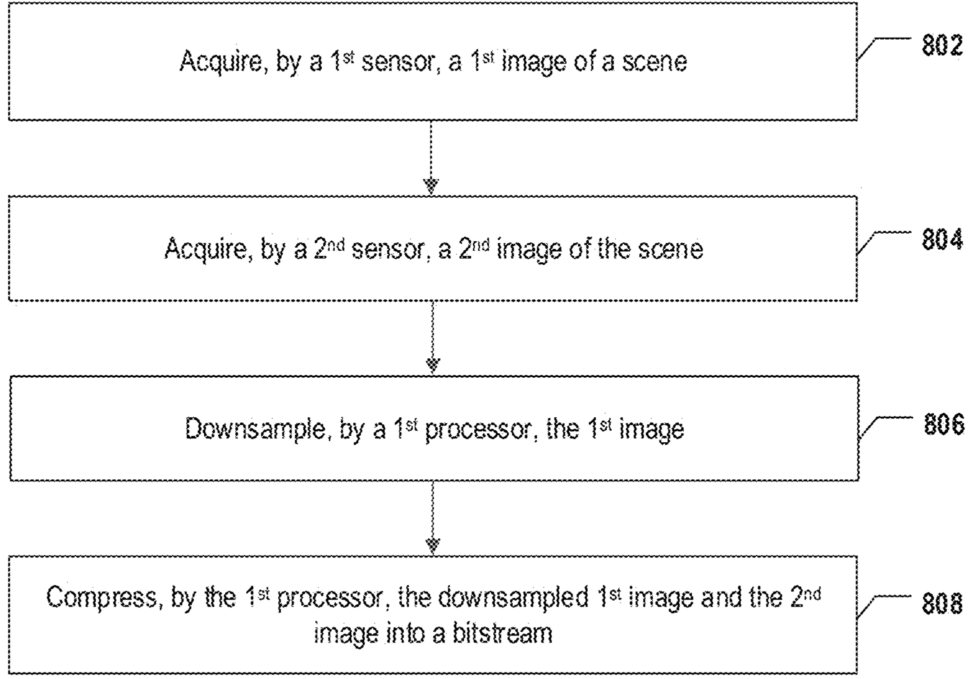
FIG. 8 illustrates a flow chart of an exemplary method for encoding, according to some embodiments of the present disclosure.

FIG. 8 illustrates a flow chart of an exemplary method 800 for encoding, according to some embodiments of the present disclosure. Method 800 may be performed by encoder 101 of encoding system 100, encoding and decoding systems 300, 301, and 303, or any other suitable image and video encoding systems. Method 800 may include operations 802, 804, 806, and 808, as described below. It is understood that some of the operations may be optional, and some of the operations may be performed simultaneously, or in a different order than shown in FIG. 8.

At operation 802, a first image of a scene is acquired by a first sensor. In some embodiments, the first image is a depth image. As shown in FIG. 3A, first sensor 108 may be configured to acquire a depth image. At operation 804, a second image of the scene is acquired by a second sensor. In some embodiments, the first image and the second image are complementary to one another with respect to the scene. In some embodiments, the second image is a color image. As shown in FIG. 3A, second sensor 108 may be configured to acquire a color image. At operation 806, the first image is downsampled by a first processor. In some embodiments, to downsample the first image, at least one of interpolation, uniform sampling, or a machine learning model is used. As shown in FIGS. 1 and 3A, downsampling module 302 of encoder 101 in processor 102 may be configured to downsample the depth image. At operation 808, The downsampled first image and the second image are compressed into a bitstream by the first processor. As shown in FIGS. 1 and 3A, compression module 304 of encoder 101 in processor 102 may be configured to compress the downsampled depth image and the color image into the output bitstream, for example, using a 3D-HEVC codec. It is understood that operations 802, 804, 806, and 808 may be repeated for each frame of a video to encode a video, such as a 3D video. It is also understood that in some examples, the first image and/or the second image may not be acquired by first and/or second sensors but obtained through any other suitable means. In one example, the first image and/or the second image may be derived or otherwise obtained from other image(s) of the scene using any suitable image analysis or processing techniques. In another example, the first image and/or the second image may be acquired by a third party and transmitted from the third party to the encoder.

Figure 9:
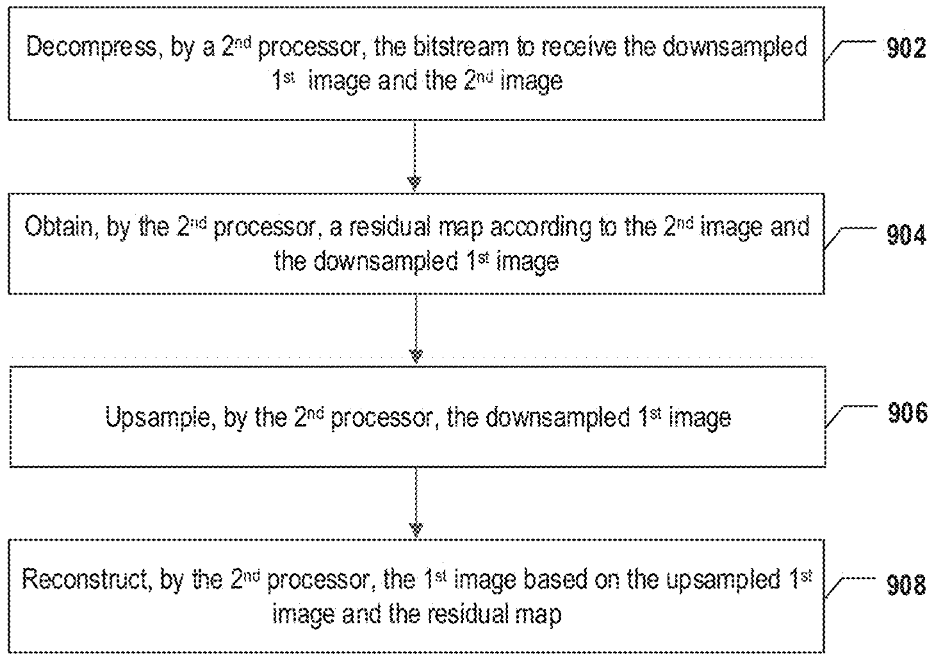
FIG. 9 illustrates a flow chart of an exemplary method for decoding, according to some embodiments of the present disclosure.

FIG. 9 illustrates a flow chart of an exemplary method 900 for decoding, according to some embodiments of the present disclosure. Method 900 may be performed by decoder 201 of decoding system 200, encoding and decoding systems 300, 301, and 303, or any other suitable image and video decoding systems. Method 900 may include operations 902, 904, 906, and 908, as described below. It is understood that some of the operations may be optional, and some of the operations may be performed simultaneously, or in a different order than shown in FIG. 9.

At operation 902, the bitstream is decompressed to receive the downsampled first image and the second image by a second processor. As shown in FIGS. 2 and 3A, decompression module 306 of decoder 201 in processor 102 may be configured to decompress the input bitstream to receive the downsampled depth image and the color image, for example, using a 3D-HEVC codec. It is understood that in some examples, the downsampled first image and/or the second image may not be obtained by the decoder from the decompressed bitstream but obtained through any other suitable means. In one example, the downsampled first image and/or the second image may be derived or otherwise obtained from other image(s) of the scene using any suitable image analysis or processing techniques. In another example, the downsampled first image and/or the second image may be acquired by sensors coupled directly to the decoder.

At operation 904, a residual map is obtained according to the second image and the downsampled first image. The residual map may be obtained from the second image based on the downsampled first image. In some embodiments, the residual map is associated with the edges of the scene. As shown in FIGS. 2 and 3A, guided upsampling module 308 of decoder 201 in processor 102 may be configured to obtain the residual map from the color image based on the downsampled depth image.

Figure 10:
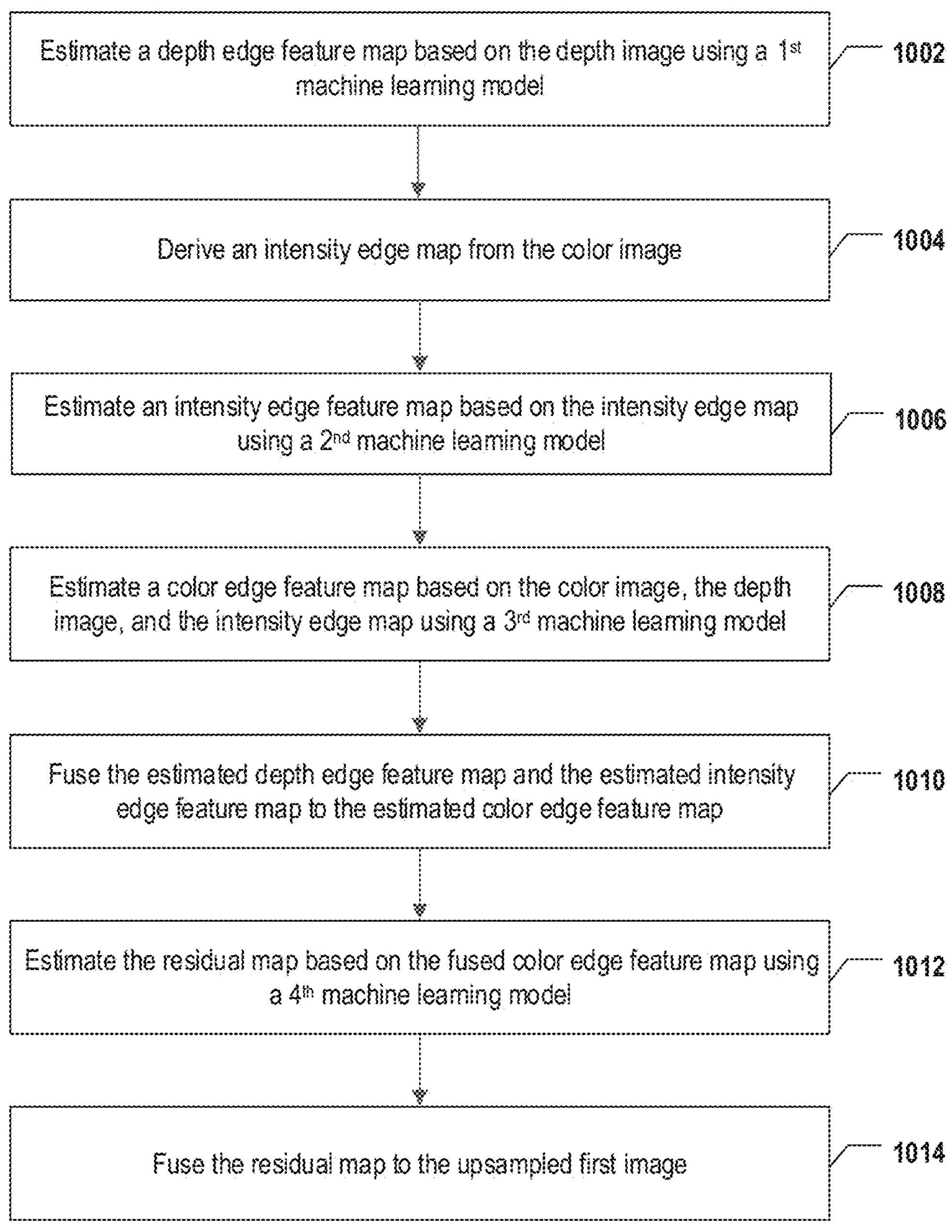
FIG. 10 illustrates a detailed flow chart of an exemplary method for decoding, according to some embodiments of the present disclosure.

Referring to FIG. 10, to obtain the residual map, in some embodiments, a depth edge feature map is estimated based on the depth image using a first machine learning model at operation 1002. In some embodiments, to estimate the depth feature map, a depth edge feature is extracted from the depth image using a first sub-model of the first machine learning model, and the extracted depth edge feature is unsampled using a second sub-model of the first machine learning model. As shown in FIGS. 5 and 6, depth path 501 of guided upsampling module 308 may be configured to estimate the depth edge feature map based on downsampled depth image $D_s'$ using machine learning model 602.

To obtain the residual map, in some embodiments, an intensity edge map is derived from the color image at operation 1004, such that the residual map associated with the edges of the scene is obtained from the color image based on the downsampled depth image and the intensity edge map. As shown in FIG. 5, color guidance unit 520 of guided upsampling module 308 may be configured to derive the intensity edge map from color image I'.

To obtain the residual map, in some embodiments, an intensity edge feature map is estimated based on the intensity edge map using a second machine learning model at operation 1006. In some embodiments, to estimate the intensity feature map, the intensity edge map is downsampled, a downsampled intensity edge feature is extracted from the downsampled intensity edge map using a first sub-model of the second machine learning model, and an intensity edge feature is extracted from the intensity edge map using a second sub-model of the second machine learning model. As shown in FIGS. 5 and 6, guidance path 505 of guided upsampling module 308 may be configured to estimate the intensity edge feature map based on the intensity edge map using machine learning model 606.

To obtain the residual map, in some embodiments, a color edge feature map is estimated based on the color image, the depth image, and the intensity edge map using a third machine learning model at operation 1008. In some embodiments, to estimate the color feature map, a color edge feature is extracted from the color image using a first sub-model of the third machine learning model, the extracted color edge feature is downsampled using a second sub-model of the third machine learning model, the extracted depth edge feature and the downsampled intensity edge feature are fused to the downsampled color edge feature, and the fused color edge feature are unsampled based on the upsampled depth edge feature using a third sub-model of the third machine learning model. The sizes of the extracted depth edge feature, the downsampled intensity edge feature, and the downsampled color edge feature may be the same. As shown in FIGS. 5 and 6, color path 503 of guided upsampling module 308 may be configured to estimate the color edge feature map based on color image I', downsampled depth image $D_s'$, and the intensity edge map using machine learning model 604.

To obtain the residual map, in some embodiments, the estimated depth edge feature map and the estimated intensity edge feature map are fused to the estimated color edge feature map at operation 1010. As shown in FIGS. 5 and 6, feature upsampling fusion unit 528 of guided upsampling module 308 may be configured to fuse the estimated depth edge feature map and the estimated intensity edge feature map to the estimated color edge feature map. To obtain the residual map, in some embodiments, the residual map is estimated based on the fused color edge feature map using a fourth machine learning model at operation 1012. As shown in FIGS. 5 and 6, feature upsampling fusion unit 528 of guided upsampling module 308 may be configured to estimating the residual map based on the fused color edge feature map using machine learning model 608.

Referring back to FIG. 9, at operation 906, the downsampled first image is upsampled by the second processor. As shown in FIGS. 5 and 6, depth upsampling unit 508 of guided upsampling module 308 may be configured to upsample downsampled depth image $D_s'$ using, for example, bicubic upsampling. At operation 908, the first image is reconstructed based on the upsampled first image and the residual map by the second processor. Referring to FIG. 10, to reconstruct the first image, in some embodiments, the residual map is fused to the upsampled first image at operation 1014. As shown in FIGS. 5 and 6, output fusion unit 530 of guided upsampling module 308 may be configured to reconstruct depth image D' by fusing the residual map to the upsampled version of downsampled depth image $D_s'$. It is understood that operations 902, 904, 906, and 908 may be repeated for each frame of a video to decode a video, such as a 3D video.

Figure 11:
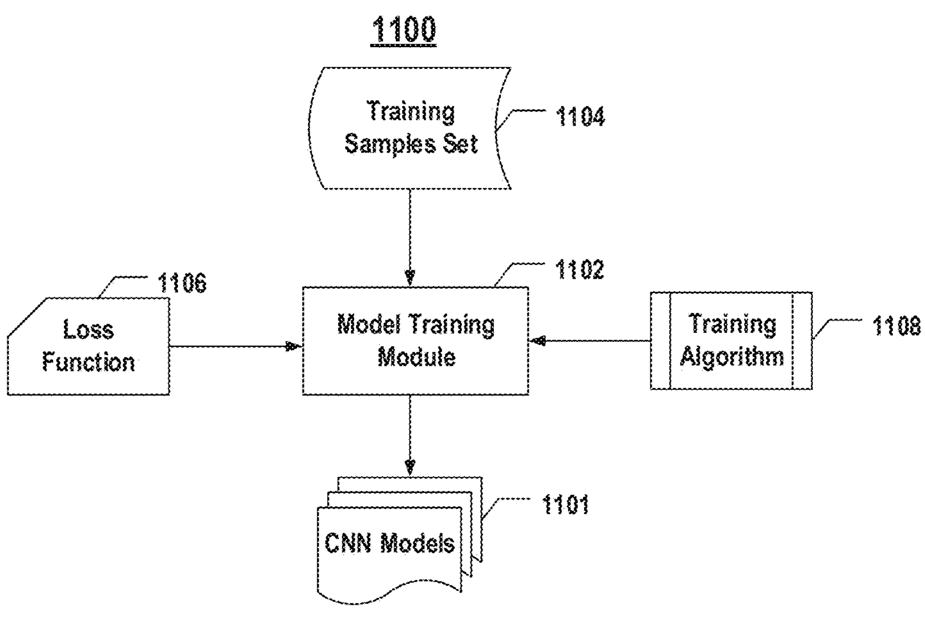
FIG. 11 illustrates a block diagram of an exemplary model training system, according to some embodiments of the present disclosure.

FIG. 11 illustrates a block diagram of an exemplary model training system 1100, according to some embodiments of the present disclosure. System 1100 may be configured to train the various machine learning models described herein, such as machine learning models 602, 604, 606, and 608 in FIG. 6. The machine learning models may be trained jointly as a single model or separately as individual models in different examples by system 1100. System 1100 may be implemented by encoding system 100, decoding system 200, or a separate computing system.

As shown in FIG. 11, system 1100 may include a model training module 1102 configured to train each CNN model 1101 over a set of training samples 1104 based on a loss function 1106 using a training algorithm 1108. CNN models 1101 may include machine learning model 602 configured to estimate a depth edge feature map based on the downsampled depth image, machine learning model 606 configured to estimate an intensity edge feature map based on an intensity edge map derived from the color image, machine learning model 604 configured to estimate a color edge feature map based on the color image, the downsampled depth image, and the intensity edge map, and machine learning model 608 configured to estimate the residual map based on the estimated color edge feature map fused with the estimated depth edge feature map and the estimated intensity edge feature map, as described above in detail.

Figure 12:
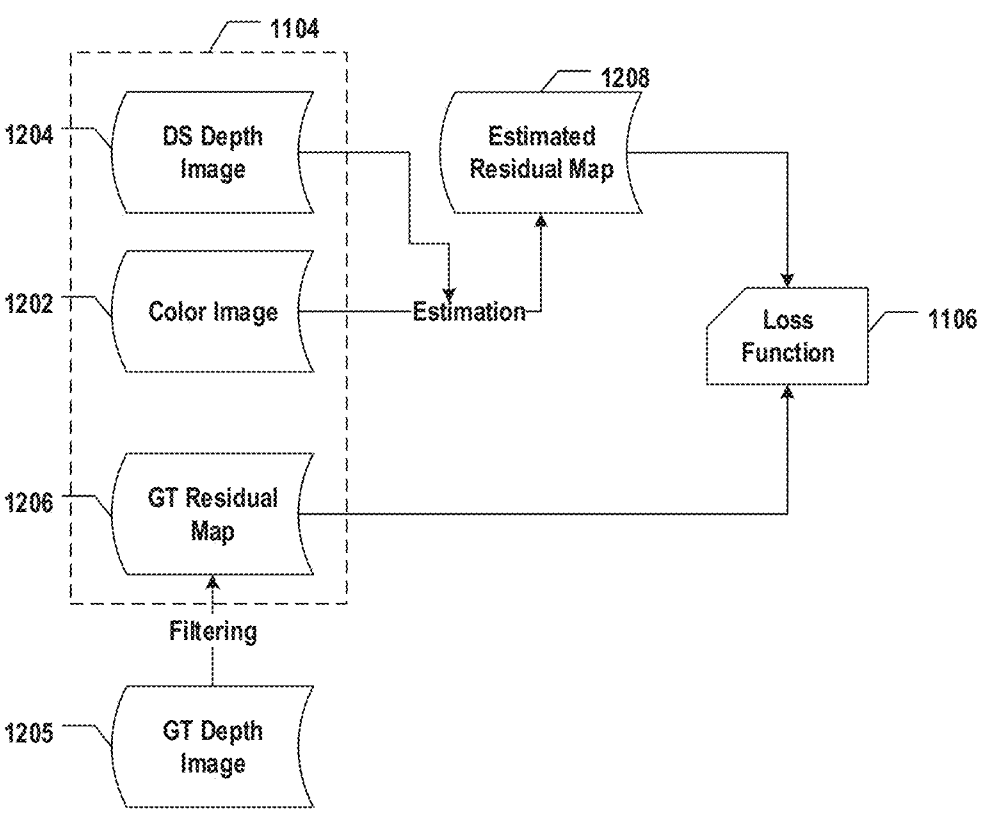
FIG. 12 illustrates an exemplary scheme for model training, according to some embodiments of the present disclosure.

In some embodiments, as shown in FIG. 12, each training sample 1104 includes a color image 1202 of a scene, a downsampled (DS) depth image 1204 of the scene, and a GT residual map 1206 associated with edges of the scene. GT residual map 1206 may be generated from a GT depth image 1205, for example, by filtering GT depth image 1205. That is, GT residual map 1206 may be the HF component of GT depth image 1205. The training may be supervised training with GT residual map 1206 in each training sample 1104 generated from a corresponding GT depth image 1205. In some embodiments, color image 1202 and downsampled depth image 1204 in each training sample 1104 are compressed. In other words, color image 1202 and downsampled depth image 1204 may be compressed and decompressed using the same codec to be used by the encoding/decoding system in which CNN models 1101 are to be used. In some embodiments, color image 1202 and downsampled depth image 1204 in each training sample 1104 are compressed based on a QP. In other words, color image 1202 and downsampled depth image 1204 may be compressed and decompressed based on the same QP that is to be used by the encoding/decoding system in which CNN models 1101 are to be used.

Referring back to FIG. 11, CNN model 1101 may include a plurality of parameters that can be jointly adjusted by model training module 1102 when being fed with training samples 1104. Model training module 1102 may jointly adjust the parameters of CNN model 1101 to minimize loss function 1106 over training samples 1104 using training algorithm 1108. Training algorithm 1108 may be any suitable iterative optimization algorithm for finding the minimum of loss function 1106, including gradient descent algorithms (e.g., the stochastic gradient descent algorithm).

As shown in FIG. 12, in some embodiments, for each training sample 1104, model training module 1102 is configured to estimate a residual map 1208 associated with the edges of the scene from color image 1202 based on downsampled depth image 1204 using CNN model(s) 1101. In some embodiments, for each training sample 1104, model training module 1102 is further configured to train CNN model(s) 1101 based on the difference between each estimated residual map 1208 and the corresponding GT residual map 1206 using loss function 1106. That is, the loss between estimated residual map 1208 and GT residual map 1206 may be calculated at the residual level, as opposed to image level, to better preserve the depth residuals. For example, loss function 1106 may combine both L1 loss $L_1$ and structural similarity index (SSIM) loss $L_{SSIM}$ with different weights as follows:

$$\text{Loss}_r(x, y) = L_1(x, y) + w \times L_{SSIM}(x, y), \tag{2}$$

where x and y are estimated residual map 1208 and the respective GT residual map 1206, respectively, and w is the weight of SSIM loss. L1 and $L_{SSIM}$ may be defined as follows:

$$L_1(x, y) = |x - y|, \tag{3}$$

$$L_{SSIM}(x, y) = [l(x, y)]^{\alpha}[c(x, y)]^{\beta}[s(x, y)]^{\gamma}, \tag{4}$$

where SSIM compares luminance, contrast, and structure simultaneously as follows:

Luminance Part:

$$l(x, y) = \frac{2\mu_x\mu_y + c_1}{\mu_x^2 + \mu_y^2 + c_1}$$

Contrast Part:

$$c(x, y) = \frac{2\sigma_x\sigma_y + c_2}{\sigma_x^2 + \sigma_y^2 + c_2}$$

Structure Part:

$$s(x_, y) = \frac{\sigma_{xy} + c_3}{\sigma_x\sigma_y + c_3}$$

where $\mu_x$ and $\mu_y$ are means of x and y, respectively;

$$\sigma_x^2$$

and $$\sigma_y^2$$

are variances of x and y; $\sigma_{xy}$ is the covariance of x and y; $c_1=(k_1L)^2$, $c_2=(k_2L)^2$ are the constants and $c_3=c_2/2$, and L is the range of pixel values. In some embodiments, since the pixel values are more important for residual maps, a larger weight may be assigned to L1 loss than SSIM loss. For example, the weight w of SSIM loss may be smaller than 1, such as 0.05.

Figure 13:
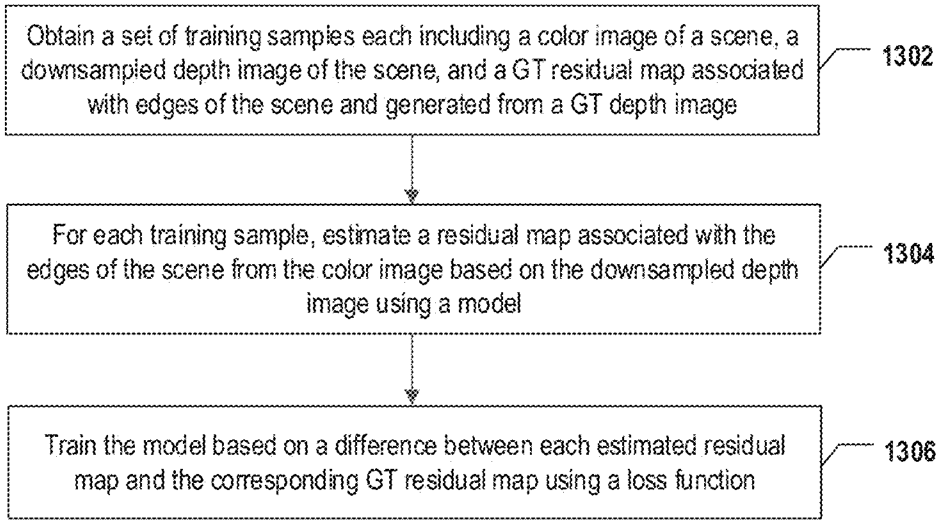
FIG. 13 illustrates a flow chart of an exemplary method for model training, according to some embodiments of the present disclosure.

FIG. 13 illustrates a flow chart of an exemplary method 1300 for model training, according to some embodiments of the present disclosure. Method 1300 may be performed by system 1100 or any other suitable model training systems. Method 1300 may include operations 1302, 1304, and 1306 as described below. It is understood that some of the operations may be optional, and some of the operations may be performed simultaneously, or in a different order than shown in FIG. 13.

At operation 1302, a set of training samples is obtained. Each training sample in the set of training samples may include a color image of a scene, a downsampled depth image of the scene, and a GT residual map associated with edges of the scene and generated from a GT depth image. As shown in FIGS. 11 and 12, training samples 1104 each including color image 1202, downsampled depth image 1204, and GT residual map 1206 may be obtained by model training module 1102. At operation 1304, for each training sample, a residual map associated with the edges of the scene is estimated from the color image based on the downsampled depth image using a model. As shown in FIGS. 11 and 12, for each training sample 1104, estimated residual map 1208 may be estimated from color image 1202 by model training module 1102 based on downsampled depth image 1204 using CNN model(s) 1101. At operation 1306, the model is trained based on a difference between each estimated residual map and the corresponding GT residual map using a loss function. As shown in FIGS. 11 and 12, for each training sample 1104, CNN model(s) 1101 may be trained by model training module 1102 based on the difference between each estimated residual map 1208 and the respective GT residual map 1206 using loss function 1106.

In various aspects of the present disclosure, the functions described herein may be implemented in hardware, software, firmware, or any combination thereof. If implemented in software, the functions may be stored as instructions on a non-transitory computer-readable medium. Computer-readable media includes computer storage media. Storage media may be any available media that can be accessed by a processor, such as processor 102 in FIGS. 1 and 2. By way of example, and not limitation, such computer-readable media can include RAM, ROM, EEPROM, CD-ROM or other optical disk storage, HDD, such as magnetic disk storage or other magnetic storage devices, Flash drive, SSD, or any other medium that can be used to carry or store desired program code in the form of instructions or data structures and that can be accessed by a processing system, such as a mobile device or a computer. Disk and disc, as used herein, includes CD, laser disc, optical disc, digital video disc (DVD), and floppy disk where disks usually reproduce data magnetically, while discs reproduce data optically with lasers. Combinations of the above should also be included within the scope of computer-readable media.

According to one aspect of the present disclosure, a method for decoding is disclosed. A first image and a second image of a scene are received by a processor. The first image is downsampled and is different from the second image. A residual map is obtained according to the second image and the downsampled first image by the processor. The downsampled first image is upsampled by the processor. The first image is reconstructed based on the upsampled first image and the residual map by the processor.

In some embodiments, the first image and the second image are complementary to one another with respect to the scene.

In some embodiments, the first image is a depth image, and the second image is a color image.

In some embodiments, the residual map is associated with edges of the scene. In some embodiments, to obtain the residual map, an intensity edge map is derived from the color image, and the residual map associated with the edges of the scene is obtained from the color image based on the downsampled depth image and the intensity edge map.

In some embodiments, to obtain the residual map associated with the edges of the scene, a depth edge feature map is estimated based on the depth image using a first machine learning model, an intensity edge feature map is estimated based on the intensity edge map using a second machine learning model, a color edge feature map is estimated based on the color image, the depth image, and the intensity edge map using a third machine learning model, the estimated depth edge feature map and the estimated intensity edge feature map are fused to the estimated color edge feature map, and the residual map is estimated based on the fused color edge feature map using a fourth machine learning model.

In some embodiments, to estimate the depth edge feature map, a depth edge feature is extracted from the depth image using a first sub-model of the first machine learning model, and the extracted depth edge feature is upsampled using a second sub-model of the first machine learning model.

In some embodiments, to estimate the intensity edge feature map, the intensity edge map is downsampled, a downsampled intensity edge feature is extracted from the downsampled intensity edge map using a first sub-model of the second machine learning model, and an intensity edge feature is extracted from the intensity edge map using a second sub-model of the second machine learning model.

In some embodiments, to estimate the color edge feature map, a color edge feature is extracted from the color image using a first sub-model of the third machine learning model, the extracted color edge feature is downsampled using a second sub-model of the third machine learning model, the extracted depth edge feature and the downsampled intensity edge feature are fused to the downsampled color edge feature, and the fused color edge feature is upsampled based on the upsampled depth edge feature using a third sub-model of the third machine learning model.

In some embodiments, sizes of the extracted depth edge feature, the downsampled intensity edge feature, and the downsampled color edge feature are the same.

In some embodiments, to reconstruct the first image, the residual map is fused to the upsampled first image.

According to another aspect of the present disclosure, a system for decoding includes a memory configured to store instructions and a processor coupled to the memory. The processor is configured to, upon executing the instructions, receive a first image and a second image of a scene. The first image is downsampled and is different from the second image. The processor is also configured to, upon executing the instructions, obtain a residual map according to the second image and the downsampled first image. The processor is further configured to, upon executing the instructions, upsample the downsampled first image, and reconstruct the first image based on the upsampled first image and the residual map.

In some embodiments, the first image and the second image are complementary to one another with respect to the scene.

In some embodiments, the first image is a depth image, and the second image is a color image.

In some embodiments, the residual map is associated with edges of the scene. In some embodiments, to obtain the residual map, the processor is further configured to derive an intensity edge map from the color image, and obtain the residual map associated with the edges of the scene from the color image based on the downsampled depth image and the intensity edge map.

In some embodiments, to obtain the residual map associated with the edges of the scene, the processor is further configured to estimate a depth edge feature map based on the depth image using a first machine learning model, estimate an intensity edge feature map based on the intensity edge map using a second machine learning model, estimate a color edge feature map based on the color image, the depth image, and the intensity edge map using a third machine learning model, fuse the estimated depth edge feature map and the estimated intensity edge feature map to the estimated color edge feature map, and estimate the residual map based on the fused color edge feature map using a fourth machine learning model.

In some embodiments, to estimate the depth edge feature map, the processor is further configured to extract a depth edge feature from the depth image using a first sub-model of the first machine learning model, and upsample the extracted depth edge feature using a second sub-model of the first machine learning model.

In some embodiments, to estimate the intensity edge feature map, the processor is further configured to downsample the intensity edge map, extract a downsampled intensity edge feature from the downsampled intensity edge map using a first sub-model of the second machine learning model, and extract an intensity edge feature from the intensity edge map using a second sub-model of the second machine learning model.

In some embodiments, to estimate the color edge feature map, the processor is further configured to extract a color edge feature from the color image using a first sub-model of the third machine learning model, downsample the extracted color edge feature using a second sub-model of the third machine learning model, fuse the extracted depth edge feature and the downsampled intensity edge feature to the downsampled color edge feature, and upsample the fused color edge feature based on the upsampled depth edge feature using a third sub-model of the third machine learning model.

In some embodiments, sizes of the extracted depth edge feature, the downsampled intensity edge feature, and the downsampled color edge feature are the same.

In some embodiments, to reconstruct the first image, the processor is further configured to fuse the residual map to the upsampled first image.

According to still another aspect of the present disclosure, a method for encoding is disclosed. A first image of a scene is acquired by a first sensor. A second image of the scene is acquired by a second sensor. The first image is downsampled by a processor. The downsampled first image and the second image are compressed into a bitstream.

In some embodiments, the first image and the second image are complementary to one another with respect to the scene.

In some embodiments, the first image is a depth image, and the second image is a color image.

In some embodiments, to downsample the first image, the first image is downsampled using at least one of interpolation, uniform sampling, or a machine learning model.

According to yet another aspect of the present disclosure, a system for encoding includes a first sensor, a second sensor, a memory configured to store instructions, and a processor coupled to the memory and the first and second sensors. The first sensor is configured to acquire a first image of a scene. The second sensor is configured to acquire a second image of the scene. The processor is configured to, upon executing the instructions, downsample the first image. The processor is also configured to, upon executing the instructions, compress the downsampled first image and the second image into a bitstream.

In some embodiments, the first image and the second image are complementary to one another with respect to the scene.

In some embodiments, the first image is a depth image, and the second image is a color image.

In some embodiments, to downsample the first image, the processor is further configured to downsample the first image using at least one of interpolation, uniform sampling, or a machine learning model.

According to yet another aspect of the present disclosure, a method for encoding and decoding is disclosed. A first image of a scene is acquired by a first sensor. A second image of the scene is acquired by a second sensor. The first image is downsampled by a first processor. A residual map is obtained according to the second image and the downsampled first image by a second processor. The downsampled first image is upsampled by the second processor. The first image is reconstructed based on the upsampled first image and the residual map by the second processor.

In some embodiments, the downsampled first image and the second image are compressed into a bitstream by the first processor, the bitstream is transmitted from the first processor to a second processor, and the bitstream is decompressed by the second processor to receive the downsampled first image and the second image.

According to yet another aspect of the present disclosure, a system for encoding and decoding includes an encoding system and a decoding system. The encoding system includes a first sensor, a second sensor, a first memory configured to store instructions, and a first processor coupled to the first memory and the first and second sensors. The first sensor is configured to acquire a first image of a scene. The second sensor is configured to acquire a second image of the scene. The first processor is configured to, upon executing the instructions, downsample the first image. The decoding system includes a second memory configured to store instructions, and a second processor coupled to the second memory. The second processor is configured to, upon executing the instructions, obtain a residual map according to the second image and the downsampled first image. The second processor is also configured to, upon executing the instructions, upsample the downsampled first image. The second processor is further configured to, upon executing the instructions, reconstruct the first image based on the upsampled first image and the residual map.

In some embodiments, the first processor of the encoding system is further configured to compress the downsampled first image and the second image into a bitstream. In some embodiments, the encoding system further includes a first interface configured to transmit the bitstream to the decoding system. In some embodiments, the decoding system further includes a second interface configured to receive the bitstream from the encoding system. In some embodiments, the second processor of the decoding system is further configured to decompress the bitstream to receive the downsampled first image and the second image.

According to yet another aspect of the present disclosure, a method for training a model is disclosed. A set of training samples is obtained by a processor. Each training sample in the set of training samples includes a color image of a scene, a downsampled depth image of the scene, and a GT residual map associated with edges of the scene and generated from a GT depth image. For each training sample, a residual map associated with the edges of the scene is estimated from the color image based on the downsampled depth image using a model by the processor. The model is trained based on a difference between each estimated residual map and the corresponding GT residual map using a loss function.

In some embodiments, the color image and the downsampled depth image in each training sample are compressed.

In some embodiments, the color image and the downsampled depth image in each training sample are compressed based on a quantization parameter.

In some embodiments, the model includes a first machine learning model configured to estimate a depth edge feature map based on the downsampled depth image, a second machine learning model configured to estimate an intensity edge feature map based on an intensity edge map derived from the color image, and a third machine learning model configured to estimate a color edge feature map based on the color image, the downsampled depth image, and the intensity edge map.

In some embodiments, the model further includes a fourth machine learning model configured to estimate the residual map based on the estimated color edge feature map fused with the estimated depth edge feature map and the estimated intensity edge feature map.

According to yet another aspect of the present disclosure, a system for training a model includes a memory configured to store instructions, and a processor coupled to the memory. The processor is configured to, upon executing the instructions, obtain a set of training samples. Each training sample in the set of training samples includes a color image of a scene, a downsampled depth image of the scene, and a GT residual map associated with edges of the scene and generated from a GT depth image. The processor is also configured to, upon executing the instructions, for each training sample, estimate a residual map associated with the edges of the scene from the color image based on the downsampled depth image using a model. The processor is further configured to, upon executing the instructions, train the model based on a difference between each estimated residual map and the corresponding GT residual map using a loss function.

In some embodiments, the color image and the downsampled depth image in each training sample are compressed.

In some embodiments, the color image and the downsampled depth image in each training sample are compressed based on a quantization parameter.

In some embodiments, the model includes a first machine learning model configured to estimate a depth edge feature map based on the downsampled depth image, a second machine learning model configured to estimate an intensity edge feature map based on an intensity edge map derived from the color image, and a third machine learning model configured to estimate a color edge feature map based on the color image, the downsampled depth image, and the intensity edge map.

In some embodiments, the model further includes a fourth machine learning model configured to estimate the residual map based on the estimated color edge feature map fused with the estimated depth edge feature map and the estimated intensity edge feature map.

The foregoing description of the embodiments will so reveal the general nature of the present disclosure that others can, by applying knowledge within the skill of the art, readily modify and/or adapt for various applications such embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Embodiments of the present disclosure have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The Summary and Abstract sections may set forth one or more but not all exemplary embodiments of the present disclosure as contemplated by the inventor(s), and thus, are not intended to limit the present disclosure and the appended claims in any way.

Various functional blocks, modules, and steps are disclosed above. The arrangements provided are illustrative and without limitation. Accordingly, the functional blocks, modules, and steps may be reordered or combined in different ways than in the examples provided above. Likewise, some embodiments include only a subset of the functional blocks, modules, and steps, and any such subset is permitted.

The breadth and scope of the present disclosure should not be limited by any of the above-described exemplary embodiments, but should be defined only in accordance with the following claims and their equivalents.

What is claimed is:

1. A method for decoding, comprising:

receiving, by a processor, a first image and a second image of a scene, wherein the first image is downsampled and is different from the second image, the first image is a depth image, and the second image is a color image;

obtaining, by the processor, a residual map associated with edges of the scene according to the second image and the downsampled first image, comprising:

deriving an intensity edge map from the color image;

estimating a depth edge feature map based on the depth image using a first machine learning model;

estimating an intensity edge feature map based on the intensity edge map using a second machine learning model;

estimating a color edge feature map based on the color image, the depth image, and the intensity edge map using a third machine learning model;

fusing the estimated depth edge feature map and the estimated intensity edge feature map to the estimated color edge feature map; and estimating the residual map based on the fused color edge feature map using a fourth machine learning model;

upsampling, by the processor, the downsampled first image; and reconstructing, by the processor, the first image based on the upsampled first image and the residual map.

2. The method of claim 1, wherein the first image and the second image are complementary to one another with respect to the scene.

3. The method of claim 1, wherein estimating the depth edge feature map comprises:

extracting a depth edge feature from the depth image using a first sub-model of the first machine learning model; and upsampling the extracted depth edge feature using a second sub-model of the first machine learning model.

4. The method of claim 3, wherein estimating the intensity edge feature map comprises:

downsampling the intensity edge map;

extracting a downsampled intensity edge feature from the downsampled intensity edge map using a first sub-model of the second machine learning model; and extracting an intensity edge feature from the intensity edge map using a second sub-model of the second machine learning model.

5. The method of claim 4, wherein estimating the color edge feature map comprises:

extracting a color edge feature from the color image using a first sub-model of the third machine learning model;

downsampling the extracted color edge feature using a second sub-model of the third machine learning model;

fusing the extracted depth edge feature and the downsampled intensity edge feature to the downsampled color edge feature; and upsampling the fused color edge feature based on the upsampled depth edge feature using a third sub-model of the third machine learning model.

6. The method of claim 5, wherein sizes of the extracted depth edge feature, the downsampled intensity edge feature, and the downsampled color edge feature are the same.

7. The method of claim 1, wherein reconstructing the first image comprises fusing the residual map to the upsampled first image.

* * * * *